US010217425B2

(12) United States Patent
Tomikawa et al.

(10) Patent No.: US 10,217,425 B2
(45) Date of Patent: Feb. 26, 2019

(54) DRIVING METHOD OF ELECTRO-OPTICAL DEVICE, ELECTRO-OPTICAL DEVICE AND ELECTRONIC APPARATUS

(71) Applicant: Seiko Epson Corporation, Tokyo (JP)

(72) Inventors: Naoki Tomikawa, Fujimi-machi (JP); Nariya Takahashi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 15/034,149

(22) PCT Filed: Oct. 30, 2014

(86) PCT No.: PCT/JP2014/005495
§ 371 (c)(1),
(2) Date: May 3, 2016

(87) PCT Pub. No.: WO2015/068364
PCT Pub. Date: May 14, 2015

(65) Prior Publication Data
US 2016/0284302 A1 Sep. 29, 2016

(30) Foreign Application Priority Data

Nov. 8, 2013 (JP) .................................. 2013-231914
Sep. 16, 2014 (JP) .................................. 2014-187353

(51) Int. Cl.
*G09G 3/36* (2006.01)
*G02F 1/1337* (2006.01)
(Continued)

(52) U.S. Cl.
CPC ......... *G09G 3/3655* (2013.01); *G02F 1/1337* (2013.01); *G02F 1/134309* (2013.01);
(Continued)

(58) Field of Classification Search
None
See application file for complete search history.

(56) References Cited

U.S. PATENT DOCUMENTS 4,765,720 A 8/1988 Toyono et al.
5,506,601 A 4/1996 Mihara et al.
(Continued)

FOREIGN PATENT DOCUMENTS

JP 63-027818 A 2/1988
JP 02-113219 A 4/1990
(Continued)

OTHER PUBLICATIONS

Search Report received in International Application No. PCT/JP2014/005495, dated Dec. 22, 2014.

*Primary Examiner* — Duane N Taylor, Jr.
(74) *Attorney, Agent, or Firm* — ALG Intellectual Property, LLC

(57) ABSTRACT

Provided are a driving method of an electro-optical device, an electro-optical device and an electronic apparatus in which reductions in display quality are suppressed. The driving method of an electro-optical device that is provided with an element substrate, a facing substrate, and a liquid crystal layer that is disposed between the element substrate and the facing substrate, includes applying an AC signal V1 to a plurality of first pixel electrode that are electrically connected to a first scanning line of the element substrate 10, and applying an AC signal V2 to a plurality of second pixel electrodes that are electrically connected to a second scanning line, which is disposed adjacent to the first scanning line, and the phase of the AC signal V2 is delayed by a predetermined amount with respect to that of the AC signal V1.

21 Claims, 16 Drawing Sheets

(51) Int. Cl.
    *G02F 1/1343* (2006.01)
    *G02F 1/1362* (2006.01)
(52) U.S. Cl.
    CPC ..... *G02F 1/136286* (2013.01); *G09G 3/3614* (2013.01); *G09G 2300/0426* (2013.01); *G09G 2300/0478* (2013.01); *G09G 2310/06* (2013.01); *G09G 2320/046* (2013.01)

(56) References Cited

U.S. PATENT DOCUMENTS

| | | | |
|---|---|---|---|
| 6,061,045 A | 5/2000 | Inaba | |
| 2002/0008800 A1 | 1/2002 | Matsumoto et al. | |
| 2008/0049053 A1* | 2/2008 | Asano | G09G 3/3233 345/697 |
| 2008/0055529 A1 | 3/2008 | Shirasaka et al. | |
| 2009/0207116 A1* | 8/2009 | Rho | G02F 1/13439 345/94 |
| 2009/0256815 A1* | 10/2009 | Westerinen | G06F 3/044 345/174 |
| 2010/0053225 A1* | 3/2010 | Furukawa | G09G 3/3611 345/690 |
| 2010/0177313 A1* | 7/2010 | Jun | G01R 31/308 356/366 |
| 2010/0207966 A1 | 8/2010 | Hosaka | |
| 2013/0249882 A1* | 9/2013 | Lin | G09G 3/3648 345/212 |
| 2014/0375922 A1* | 12/2014 | Park | G02F 1/136286 349/46 |

FOREIGN PATENT DOCUMENTS

| | | |
|---|---|---|
| JP | 09-005709 A | 1/1997 |
| JP | 10-221703 A | 8/1998 |
| JP | 11-142881 A | 5/1999 |
| JP | 11-282434 A | 10/1999 |
| JP | 2002-040482 A | 2/2002 |
| JP | 2002-122840 A | 4/2002 |
| JP | 2007-279172 A | 10/2007 |
| JP | 2007-316119 A | 12/2007 |
| JP | 2008-020725 A | 1/2008 |
| JP | 2008-058497 A | 3/2008 |
| JP | 2008-292861 A | 12/2008 |
| JP | 2009-092697 A | 4/2009 |
| JP | 2010-191038 A | 9/2010 |
| JP | 2012-042872 A | 3/2012 |
| JP | 2012-220838 A | 11/2012 |
| JP | 2012-226251 A | 11/2012 |

* cited by examiner

DRIVING METHOD OF ELECTRO-OPTICAL DEVICE, ELECTRO-OPTICAL DEVICE AND ELECTRONIC APPARATUS

TECHNICAL FIELD

The present invention relates to a driving method of an electro-optical device, an electro-optical device and an electronic apparatus.

BACKGROUND ART

As electro-optical devices, for example, active drive type liquid crystal devices that are provided with a transistor for each pixel as an element that performs switching control of pixel electrodes, are known. Liquid crystal devices are used, for example, in direct view displays, light bulbs and the like.

In such liquid crystal devices, when light is incident, a liquid crystal material, an orientation film, and the like that configure a liquid crystal panel, and incidence light undergo a photochemical reaction, and ionic impurities are generated as reaction products. In addition, in a manufacturing process of a liquid crystal panel, the presence of ionic impurities that diffuse from a sealing material, a sealant or the like, to a liquid crystal layer, is also known. In particular, in a liquid crystal device that is used in an optical modulation means (a light bulb) of a projection type display device (a projector), since the luminous flux density of incidence light is higher than that in a direct view type display liquid crystal device, it is necessary to suppress a circumstance in which the ionic impurities exhibit an effect on the display.

For example, as means for suppressing an effect of the ionic impurities on the display, PTL 1 discloses a method that divides an effective pixel region into a plurality, and sweeps ionic impurities to a region on an outer side of an effective pixel region using a horizontal electric field that is applied by changing the amplitude for each region (or in other words, setting a different potential for each region).

CITATION LIST

Patent Literature

PTL 1: Japanese Unexamined Patent Application Publication No. 2008-292861

SUMMARY OF INVENTION

Technical Problem

However, in the method of PTL 1, there is a problem in that the voltage of the horizontal electric field, which is applied due to differences in amplitude, is small, and a flushing efficiency of ionic impurities is poor. In addition, in PTL 1, there is a problem in that a specific method that causes the voltage values to differ for each region is not disclosed.

Solution to Problem

An aspect of the invention was devised in order to solve at least a portion of the above-mentioned problems, and can be realized in the following forms or application examples.

APPLICATION EXAMPLE 1

According to this application example, there is provided a driving method of an electro-optical device that is provided with a first substrate, a second substrate that is disposed facing the first substrate, and an electro-optical layer that is disposed between the first substrate and the second substrate, the method including applying a first signal to a first pixel electrode that is electrically connected to first wiring, which is disposed so as to cover the first substrate, and applying a second signal to a second pixel electrode that is electrically connected to second wiring, which is disposed adjacent to the first wiring, in which the phase of the second signal is delayed by a predetermined amount with respect to that of the first signal.

According to this application example, since the first signal and the second signal are applied to the respective pieces of wiring so that the phase of the second wiring is delayed with respect to the that of the first wiring, the distribution of an electric field that is generated between the first pixel electrode and the second pixel electrode migrates toward a direction of the second wiring from the first wiring. As a result of this, it is possible to sweep up ionic impurities that are included inside the electro-optical layer in the direction of the second wiring from the first wiring.

APPLICATION EXAMPLE 2

In the driving method of an electro-optical device according to the application example, it is preferable that the applying a third signal to a third pixel electrode that is electrically connected to third wiring, which is disposed facing the first wiring so as to interpose the second wiring therebetween, is further included, and that the phase of the third signal is delayed by a predetermined amount with respect to that of the second signal.

According to the application example, since the third signal, which has a phase that is delayed with respect to that of the second signal, is applied to the third wiring, or in other words, since the signals are applied so that the phases thereof are delayed in the order of the first wiring, the second wiring and the third wiring, the distribution of an electric field that is generated between each pixel electrode migrates toward a direction of the third wiring from the first wiring. As a result of this, it is possible to sweep up ionic impurities that are included inside the electro-optical layer in the direction of the third wiring from the first wiring.

APPLICATION EXAMPLE 3

In the driving method of an electro-optical device according to the application example, it is preferable that a frequency of the first signal is 10 mHz to 50 mHz.

According to the application example, since a signal with the above-mentioned frequency is applied to a pixel electrode, it is possible to follow the migration of the ionic impurities, and therefore, it is possible to efficiently sweep the ionic impurities in the direction of the third wiring from the first wiring.

APPLICATION EXAMPLE 4

In the driving method of an electro-optical device according to the application example, it is preferable that a difference between a temporal average and a reference potential of a voltage of the first signal is substantially 0 V.

According to the application example, since a difference between a temporal average of a voltage and a reference potential of each signal that is applied is substantially 0 V (more specifically, for example, 100 mV or less), or in other words, since the voltage transitions between a high potential and a low potential with respect to the reference potential (an AC signal), (−) ionic impurities are swept to a pixel electrode in a case in which a (+) potential is applied to the pixel electrode, and (+) ionic impurities are swept to a pixel electrode in a case in which a (−) potential is applied to the pixel electrode. As a result of applying such a signal, it is possible to cause an electric field to migrate toward a direction of the second wiring from the first wiring, and therefore, it is possible to sweep up both (+) and (−) ionic impurities.

APPLICATION EXAMPLE 5

In the driving method of an electro-optical device according to the application example, it is preferable that the frequency of the first signal is changed depending on a temperature of the electro-optical layer.

According to the application example, since a migration amount of ionic impurities is dependent upon temperature, it is necessary to establish the frequency of the signal depending on the temperature. As a result of this, for example, if the temperature of the electro-optical layer is higher than room temperature, it is possible to rapidly sweep ionic impurities by setting the frequency to be high. If the temperature of the electro-optical layer is lower than room temperature, it is possible to follow a migration rate of ionic impurities by setting the frequency to be low, and therefore, it is possible to reliably sweep up ionic impurities.

APPLICATION EXAMPLE 6

In the driving method of an electro-optical device according to the application example, it is preferable that the first wiring and the second wiring are scanning lines.

According to the application example, since the first wiring to the third wiring are scanning lines, it is possible to apply signals, in which the phases are delayed toward the direction of the third wiring from the first wiring, for each scanning line by using a row-direction line inversion driving technique.

APPLICATION EXAMPLE 7

In the driving method of an electro-optical device according to the application example, it is preferable that the scanning lines are disposed along a long edge of an effective pixel region, and are disposed from a center of the effective pixel region toward an outer side in an order of the first wiring and the second wiring.

According to the application example, since the second wiring and the third wiring are disposed toward an outer side of the effective pixel region with a scanning line (the first wiring), which is in the center of the effective pixel region, as a boundary, and ionic impurities are swept toward a direction of the third wiring from the first wiring, or in other words, ionic impurities are swept in a direction that is parallel to a short edge of the effective pixel region, it is possible to sweep rapidly in comparison with a method that sweeps along a long edge.

APPLICATION EXAMPLE 8

In the driving method of an electro-optical device according to the application example, it is preferable that the waveform of the first signal is any one of a rectangular wave, a sine wave, and a triangular wave.

According to the application example, since the any one of a rectangular wave, a sine wave, and a triangular wave is used, it is possible to form signals in which the phases are delayed by 120° each. Accordingly, it is possible to sweep ionic impurities in a direction of the third wiring from the first wiring. The order of a rectangular wave, a triangular wave and a sine wave is an example of a sequence according to which it is easy to make a signal waveform. A sine wave is an optimal signal waveform.

APPLICATION EXAMPLE 9

According to this application example, there is provided a driving method of an electro-optical device that is provided with a first substrate, a second substrate that is disposed facing the first substrate, an electro-optical layer that is disposed between the first substrate and the second substrate, first wiring that is disposed so as to cover the first substrate, second wiring that is disposed adjacent to the first wiring, a first pixel electrode that is electrically connected to the first wiring via a first switching element, a second pixel electrode that is electrically connected to the second wiring via a second switching element, and selection wiring that is electrically connected to the first switching element and the second switching element, in which, when the first switching element and the second switching element are selected by applying a voltage to the selection wiring, a first signal is applied to the first wiring, and a second signal with a phase that differs from that of the first signal, is applied to the second wiring.

According to this application example, since a signal in which the phases of a plurality of second pixel electrodes differ from (are delayed with respect to) those of a plurality of first pixel electrodes, is applied, the distribution of an electric field that is generated between the first pixel electrode and the second pixel electrode migrates toward a direction of the second wiring from the first wiring. As a result of this, it is possible to sweep up ionic impurities that are included inside the electro-optical layer in the direction of the second wiring from the first wiring.

APPLICATION EXAMPLE 10

In the driving method of an electro-optical device according to the application example, the electro-optical device is provided with third wiring that is disposed facing the first wiring so as to interpose the second wiring, and a third pixel electrode that is electrically connected to the third wiring via a third switching element, and, when the first switching element, the second switching element and the third switching element are selected by applying a voltage to the selection wiring, a third signal with a phase that differs from those of the first signal and the second signal, is applied to the third wiring.

According to the application example, since the third signal, which has a phase that is delayed with respect to that of the second signal (differs from the second signal), is applied to the third wiring, or in other words, since the signals are applied so that the phases thereof are delayed in the order of the first wiring, the second wiring and the third wiring, the distribution of an electric field that is generated between each pixel electrode migrates toward a direction of the third wiring from the first wiring. As a result of this, it is possible to sweep up ionic impurities that are included inside the electro-optical layer in the direction of the third wiring from the first wiring.

APPLICATION EXAMPLE 11

According to this application example, there is provided an electro-optical device that is provided with a first substrate, a second substrate that is disposed facing the first substrate, and an electro-optical layer that is disposed between the first substrate and the second substrate, a first pixel electrode that is disposed so as to cover the first substrate, first wiring, which is electrically connected to the first pixel electrode, and to which a first signal is applied, a second pixel electrode, and second wiring that is disposed adjacent to the first wiring, is electrically connected to the second pixel electrode, and to which a second signal is applied, in which the phase of the second signal is delayed by a predetermined amount with respect to that of the first signal.

According to this application example, since the first signal and the second signal are applied to the respective pieces of wiring so that the phase of the second wiring is delayed with respect to the that of the first wiring, the distribution of an electric field that is generated between the first pixel electrode and the second pixel electrode migrates toward a direction of the second wiring from the first wiring. As a result of this, it is possible to sweep up ionic impurities that are included inside the electro-optical layer in the direction of the second wiring from the first wiring.

APPLICATION EXAMPLE 12

In the electro-optical device according to the application example, it is preferable that a third pixel electrode, and third wiring that is disposed facing the first wiring so as to interpose the second wiring, is electrically connected to third pixel electrode, and to which a third signal is applied, are further included, and that the phase of the third signal is delayed by a predetermined amount with respect to that of the second signal.

According to the application example, since the third signal, which has a phase that is delayed with respect to that of the second signal, is applied to the third wiring, or in other words, since the signals are applied so that the phases thereof are delayed in the order of the first wiring, the second wiring and the third wiring, the distribution of an electric field that is generated between each pixel electrode migrates toward a direction of the third wiring from the first wiring. As a result of this, it is possible to sweep up ionic impurities that are included inside the electro-optical layer in the direction of the third wiring from the first wiring.

APPLICATION EXAMPLE 13

In the electro-optical device according to the application example, it is preferable that a frequency of the first signal is 10 mHz to 50 mHz.

According to the application example, since a signal with the above-mentioned frequency is applied to a pixel electrode, it is possible to follow the migration of the ionic impurities, and therefore, it is possible to efficiently sweep the ionic impurities in the direction of the third wiring from the first wiring.

APPLICATION EXAMPLE 14

In the electro-optical device according to the application example, it is preferable that a difference in potential between a temporal average and a reference potential of a voltage of the first signal is substantially 0 V.

According to the application example, since a difference between a temporal average and a reference potential of a voltage each signal that is applied is substantially 0 V (more specifically, for example, 100 mV or less), or in other words, since the voltage transitions between a high potential and a low potential with respect to the reference potential (an AC signal), (−) ionic impurities are swept to a pixel electrode in a case in which a (+) potential is applied to the pixel electrode, and (+) ionic impurities are swept to a pixel electrode in a case in which a (−) potential is applied to the pixel electrode. As a result of applying such a signal, it is possible to cause an electric field to migrate toward a direction of the second wiring from the first wiring, and therefore, it is possible to sweep up both (+) and (−) ionic impurities.

APPLICATION EXAMPLE 15

In the electro-optical device according to the application example, it is preferable that the first wiring and the second wiring are scanning lines.

According to the application example, since the first wiring to the third wiring are scanning lines, it is possible to apply signals, in which the phases are delayed toward the direction of the third wiring from the first wiring, for each scanning line by using a row-direction line inversion driving technique.

APPLICATION EXAMPLE 16

In the electro-optical device according to the application example, it is preferable that the electro-optical layer is a liquid crystal layer, and that an inorganic orientation film is disposed on a liquid crystal layer side of the first substrate and the second substrate.

According to the application example, when ionic impurities become attached to the inorganic orientation film for orienting the liquid crystal, it is difficult for ionic impurities to become separated therefrom. However, since ionic impurities are swept up in a direction of the third wiring from the first wiring as a result of a signal being applied to the pixel electrode in the above-mentioned manner, it is possible to suppress a circumstance in which display defects are caused as a result of ionic impurities remaining in the effective pixel region.

APPLICATION EXAMPLE 17

According to this application example, there is provided an electro-optical device including a first substrate, a second substrate that is disposed facing the first substrate, an electro-optical layer that is disposed between the first substrate and the second substrate, first wiring that is disposed so as to cover the first substrate, second wiring that is disposed adjacent to the first wiring, a first pixel electrode that is electrically connected to the first wiring via a first switching element, a second pixel electrode that is electrically connected to the second wiring via a second switching element, and selection wiring that is electrically connected to the first switching element and the second switching element, in which, when the first switching element and the second switching element are selected by applying a voltage to the selection wiring, a first signal is applied to the first wiring, and a second signal with a phase that differs from that of the first signal, is applied to the second wiring.

According to this application example, since a signal in which the phase of the second pixel electrode differs from (is delayed with respect to) that of the first pixel electrode, is applied, the distribution of an electric field that is generated between the first pixel electrode and the second pixel electrode migrates toward a direction of the second wiring from the first wiring. As a result of this, it is possible to sweep up ionic impurities that are included inside the electro-optical layer in the direction of the second wiring from the first wiring.

APPLICATION EXAMPLE 18

In the electro-optical device according to the application example, it is preferable that third wiring that is disposed facing the first wiring so as to interpose the second wiring, and a third pixel electrode that is electrically connected to the third wiring via a third switching element, are further included, and that, when the first switching element, the second switching element and the third switching element are selected by applying a voltage to the selection wiring, a third signal with a phase that differs from those of the first signal and the second signal, is applied to the third wiring.

According to the application example, since the third signal, which has a phase that is delayed with respect to that of the second signal (differs from the second signal), is applied to the third wiring, or in other words, since the signals are applied so that the phases thereof are delayed in the order of the first wiring, the second wiring and the third wiring, the distribution of an electric field that is generated between each pixel electrode migrates toward a direction of the third wiring from the first wiring. As a result of this, it is possible to sweep up ionic impurities that are included inside the electro-optical layer in the direction of the third wiring from the first wiring.

APPLICATION EXAMPLE 19

According to this application example, there is provided an electronic apparatus including the above-mentioned electro-optical device.

According to the application example, since the electronic apparatus is provided with the above-mentioned electro-optical device, it is possible to provide an electronic apparatus in which reductions in display quality are suppressed.

DESCRIPTION OF EMBODIMENTS

Hereinafter, embodiments in which the present invention takes specific forms will be described according to the drawings. Additionally, the drawings that are used are displayed enlarged or reduced as appropriate so that the portions to be described are in states that are recognizable.

Additionally, in the embodiments below, for example, in a case in which the description "on the substrate" is used, the description represents a situation of being disposed so as to be in contact with the top of the substrate, a situation of being disposed on top of the substrate through another component, or a situation of a portion thereof being disposed so as to be in contact with the top of the substrate and a portion thereof being disposed through another component.

First Embodiment

In the present embodiment, description will be given using an active matrix type liquid crystal device that is provided with a thin film transistor (TFT) as a pixel switching element, as an example of an electro-optical device. Such a liquid crystal device can, for example, be suitably used as the optical modulation means (a liquid crystal light bulb) of a projection type display device (a liquid crystal projector) that will be described later.

(Configuration of Liquid Crystal Device)

Figure 1:
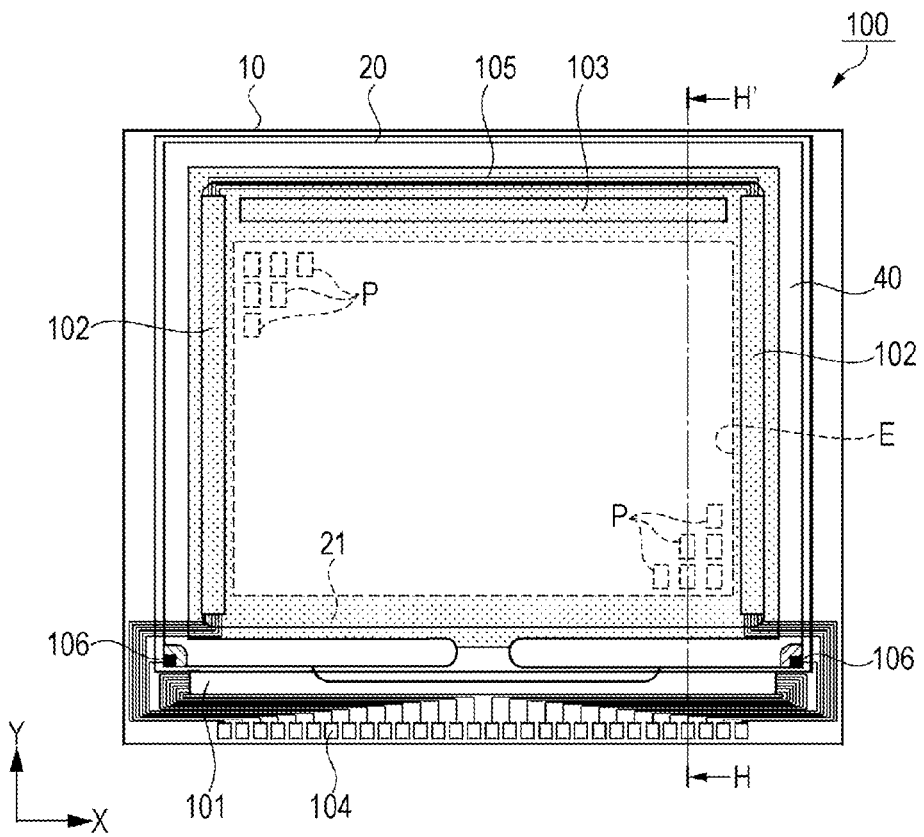
FIG. 1 is a schematic plan view that shows a configuration of a liquid crystal device of a first embodiment.
Figure 2:
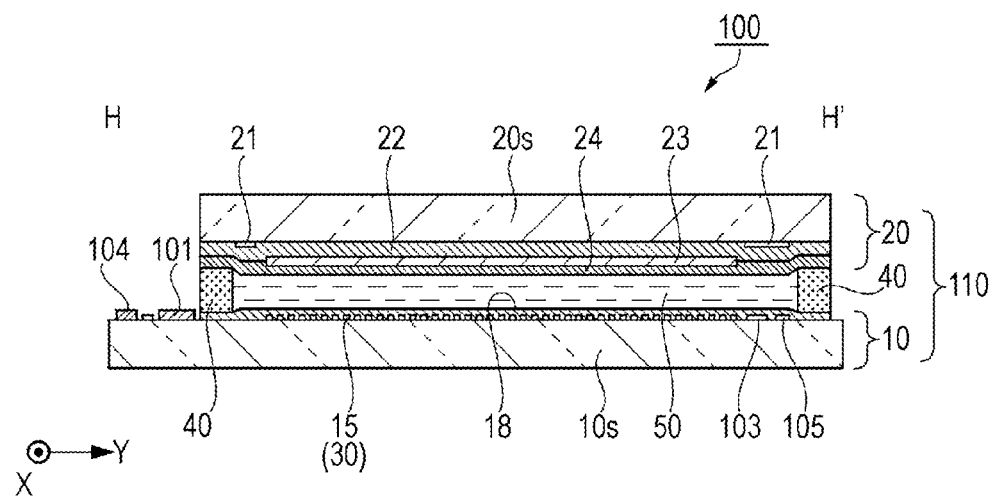
FIG. 2 is a schematic cross-sectional view along a line H-H' of the liquid crystal device that is shown in FIG. 1.
Figure 3:
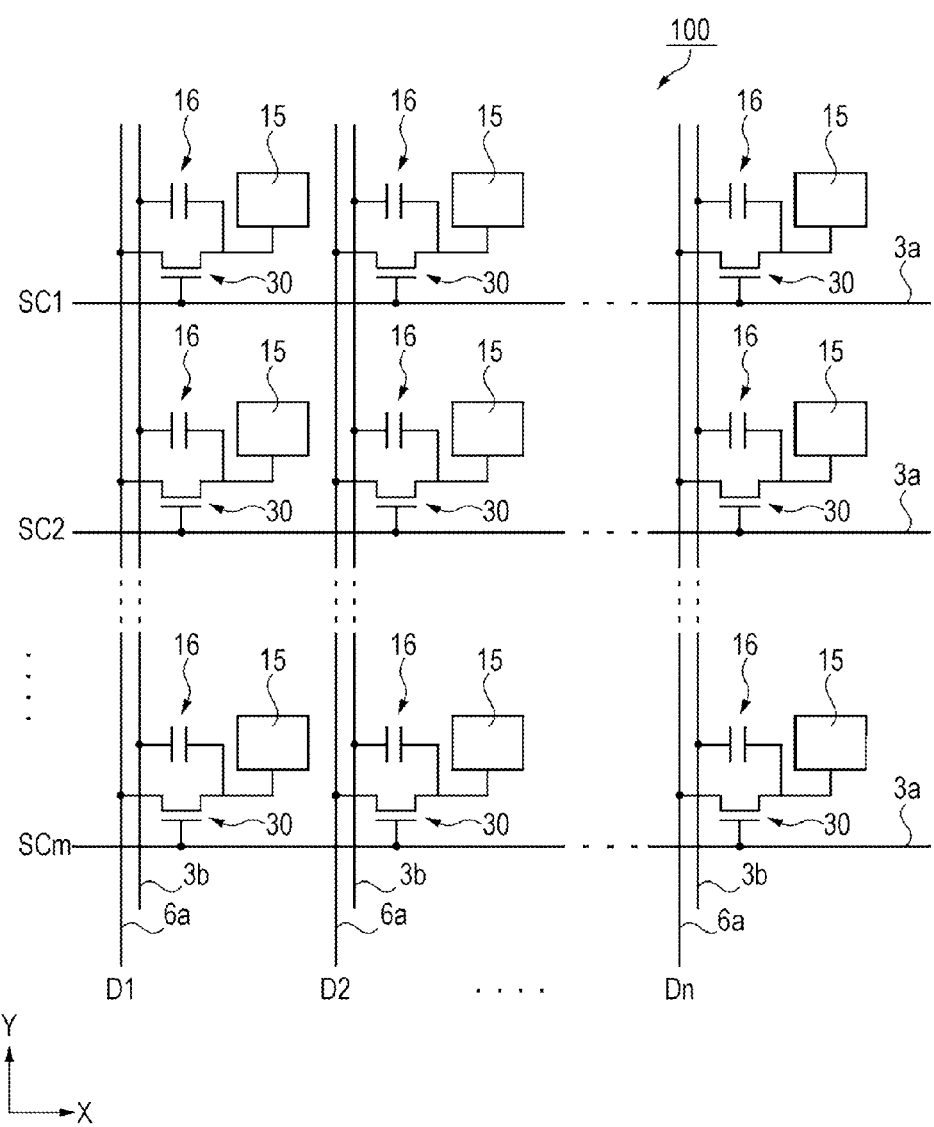
FIG. 3 is an equivalent circuit diagram that shows an electrical configuration of the liquid crystal device.

FIG. 1 is a schematic plan view that shows a configuration of a liquid crystal device. FIG. 2 is a schematic cross-sectional view along a line H-H' of the liquid crystal device that is shown in FIG. 1. FIG. 3 is an equivalent circuit diagram that shows an electrical configuration of the liquid crystal device. Hereinafter, a configuration of the liquid crystal device will be described with reference to FIGS. 1 to 3.

As shown in FIGS. 1 and 2, the liquid crystal device 100 of the present embodiment includes an element substrate 10, as a first substrate, and a facing substrate 20, as a second substrate, which are disposed facing one another, and a liquid crystal layer 50 that is sandwiched by the pair of substrates. For example, a base material 10s of the element substrate 10 uses a substrate such as a glass substrate, a quartz substrate or a silicon substrate. For example, a base material 20s of the facing substrate 20 uses a transparent substrate such as a glass substrate or a quartz substrate.

The element substrate 10 is larger than the facing substrate 20, and both substrates are bonded together using a sealing material 40 that is disposed along the outer periphery of the facing substrate 20. The liquid crystal layer 50 is configured by liquid crystal, which has either positive or negative dielectric anisotropy, being enclosed in a gap between the substrates.

The sealing material 40 for example, uses an adhesive such as a thermosetting or an ultraviolet curable epoxy resin. A spacer (not shown in the drawing) for retaining a uniform space between the pair of substrates is mixed into the sealing material 40.

A display region E, which includes a plurality of pixels P that are arranged in matrix form, is provided on an inner side of the sealing material 40. In addition, a break line section 21 is provided between the sealing material 40 and the display region E, encircling the display region E. The break line section 21 is, for example, formed from a light-shielding metal or metal oxide.

A dummy pixel region (not illustrated in the drawings) that does not contribute to display is provided surrounding the display region E. In addition, although omitted from FIGS. 1 and 2, a light-shielding section (a black matrix; BM) that respectively partitions the plurality of pixels P in a planar manner is provided on the facing substrate 20 in the display region E.

A terminal section in which a plurality of external connection terminals 104 are arranged, is provided on the element substrate 10. A data line driving circuit 101 is provided between a first edge section along the terminal section and the sealing material 40. In addition, a detection circuit 103 is provided between the sealing material 40 along a second edge section that faces the first edge section, and the display region E.

Furthermore, scanning line driving circuits 102 are provided between the sealing material 40 along a third edge section and a fourth edge section, which are orthogonal to the first edge section and which mutually face one another, and the display region E. In addition, a plurality of pieces of wiring 105 that connects the two scanning line driving circuits 102 is provided between the sealing material 40 of the second edge section and the detection circuit 103.

The wiring that connects the data line driving circuit 101 and the scanning line driving circuit 102 is connected to the plurality of external connection terminal 104 that are arranged along the first edge section. Hereinafter, description will be given referring to a direction along the first edge section as an X direction, and a direction along the third edge section and the fourth edge section, which are orthogonal to the first edge section, and which mutually face one another as a Y direction. Additionally, the disposition of the detection circuit 103 is not limited to the above-mentioned disposition, and the detection circuit 103 may be provided between the sealing material 40 along the data line driving circuit 101 and the display region E.

As shown in FIG. 2, translucent pixel electrodes 15 and thin film transistors (TFTs, hereinafter referred to as "TFTs 30"), as switching elements, which are provided in each pixel P, signal wiring, and an alignment film 18 that covers the pixel electrodes 15 and the TFTs 30, are formed on a front surface of a liquid crystal layer 50 side of the base material 10s.

In addition, a light-shielding structure, which prevents a switching action from becoming irregular due to light being incident to a semiconductor layer in the TFT 30, is adopted.

The element substrate 10 includes at least the base material 10s, the pixel electrodes 15 that are formed on the base material 10s, the TFTs 30, the signal wiring and the alignment film 18.

The break line section 21, an insulation layer 22 that is formed to cover the break line section 21, a facing electrode 23 that is provided to cover the insulation layer 22, and an alignment film 24 that covers the facing electrode 23 are provided on the front surface of the liquid crystal layer 50 side of the base material 20s. The facing substrate 20 in the present invention includes at least the break line section 21, the facing electrode 23 and the alignment film 24.

As shown in FIG. 1, in addition to encircling the display region E, the break line section 21 is provided in a position that overlaps with the scanning line driving circuit 102 and the detection circuit 103 in a planar manner. As a result of this, light that is incident to these circuits from a facing substrate 20 side is screened, and the circuits serve a purpose of preventing false action as a result of light. In addition, stray light that is not necessary is screened so as to not be incident to the display region E, and high contrast is maintained in the display of the display region E.

The insulation layer 22 is, for example, formed from an inorganic material such as silicon oxide, has a light-transmitting property, and is provided so as to cover the break line section 21. As a method for forming such an insulation layer 22, for example, a method that forms a film using a plasma Chemical Vapor Deposition (CVD) technique or the like may be used.

The facing electrode 23 is, for example, formed from a transparent conductive film such as Indium Tin Oxide (ITO), and in addition to covering the insulation layer 22, is electrically connected to upper and lower conduction sections 106, which are provided in corners of the facing substrate 20 as shown in FIG. 1. The upper and lower conduction sections 106 are electrically connected to wiring of an element substrate 10 side.

The alignment film 18 that covers the pixel electrodes 15 and the alignment film 24 that covers the facing electrode 23 are selected on the basis of the optical design of the liquid crystal device 100. For example, an alignment film with a substantially vertical alignment with respect to liquid crystal molecules that have negative dielectric anisotropy, which is formed by forming a film from an inorganic material such as SiOx (silicon oxide) using vapor-phase growth, can be used as the alignment films 18 and 24.

This kind of liquid crystal device 100 is for example, a transmissive type, and can use a normally white mode in which the transmittance of the pixels P is greater when a voltage is not applied than the transmittance during voltage application, or a normally black mode optical design in which the transmittance of the pixels P is smaller when a voltage is not applied than the transmittance during voltage application. Polarizing elements are respectively used on an incidence side and an emission side of a liquid crystal panel 110, which includes the element substrate 10 and the facing substrate 20, by being disposed depending on the optical design.

In the present embodiment, hereinafter, an example in which a normally black mode optical design that uses the above-mentioned orientation films as the orientation films 18 and 24, and uses liquid crystal that has negative dielectric anisotropy, is adopted.

As shown in FIG. 3, in the display region E, the liquid crystal device 100 includes at least a plurality of scanning lines 3a and a plurality of data lines 6a (fourth wiring, and fifth wiring that is disposed adjacent to the fourth wiring) as pieces of signal wiring that are mutually insulated from and are orthogonal to one another, and capacity lines 3b that are disposed in parallel along the data lines 6a. The direction in which the scanning lines 3a extend is the X direction and the direction in which the data lines 6a extend is the Y direction.

The pixel electrodes 15, the TFTs 30 and capacity elements 16 are provided in regions that are partitioned by the scanning lines 3a, the data lines 6a and the capacity lines 3b, and these components configure a pixel circuit of a pixel P.

The scanning lines 3a are electrically connected to gates of the TFTs 30, and the data lines 6a are electrically connected to data line side source and drain regions (one source and drain region) of the TFTs 30. The pixel electrodes 15 are electrically connected to pixel electrode side source and drain regions (another source and drain region) of the TFTs 30.

The data lines 6a are electrically connected to the data line driving circuit 101 (refer to FIG. 1), and image signals D1, D2, . . . , Dn that are supplied from the data line driving circuit 101 are supplied to the pixels P. The scanning lines 3a are connected to the scanning line driving circuits 102 (refer to FIG. 1), and scanning signals SC1, SC2, . . . , SCm that are supplied from the scanning line driving circuits 102 are supplied to the pixels P.

The image signals D1 to Dn that are supplied to the data lines 6a from the data line driving circuit 101 may be supplied sequentially to each line in this order, or may be supplied for each group to a plurality of mutually adjacent data lines 6a. The scanning line driving circuits 102 supply the scanning signals SC1 to SCm sequentially to each scanning line 3a at a predetermined timing in pulses.

As a result of the TFTs 30, which are switching elements, only being in on states for a fixed period of time due to the input of the scanning signals SC1 to SCm, the liquid crystal device 100 has a configuration in which the image signals D1 to Dn that are supplied from the data lines 6a are written into the pixel electrodes 15 at a predetermined timing. Further, image signals D1 to Dn of a predetermined level, which are written into the liquid crystal layer 50 through the pixel electrodes 15 are maintained for a fixed period of time between the pixel electrodes 15 and the facing electrode 23, which is disposed facing the pixel electrodes 15 through the liquid crystal layer 50.

In order to prevent the maintained image signals D1 to Dn from leaking, a liquid crystal capacity that is formed between the pixel electrodes 15 and the facing electrode 23 and the capacity elements 16 are connected in parallel. The capacity elements 16 are provided between the source and drain regions on the pixel electrode side of the TFTs 30 and the capacity lines 3b. The capacity elements 16 have a dielectric layer between two capacity electrodes.

(Configuration of Pixels Configuring Liquid Crystal Device)

Figure 4:
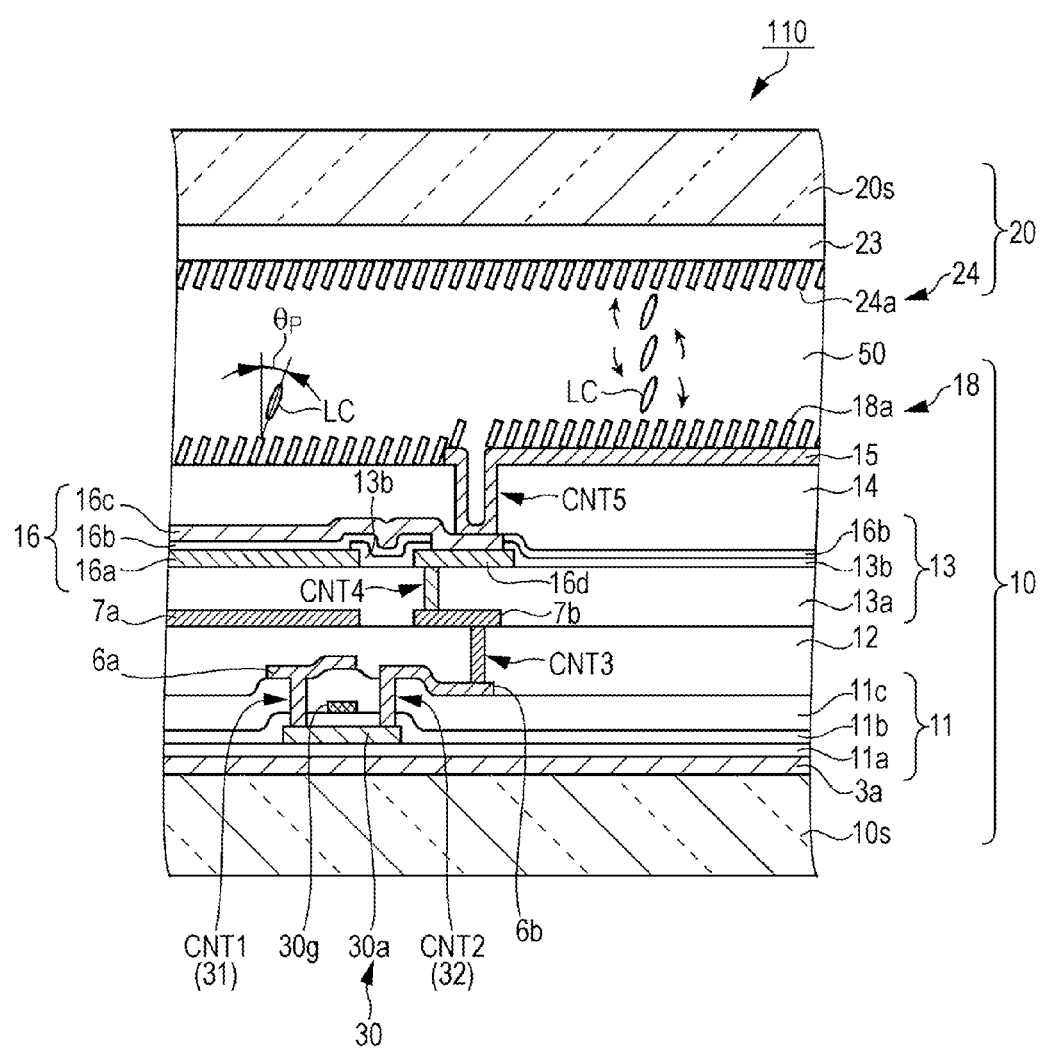
FIG. 4 is a schematic cross sectional view that chiefly shows a structure of a pixel of the liquid crystal device.

FIG. 4 is a schematic cross sectional view that chiefly shows a structure of a pixel of the liquid crystal device. Hereinafter, a structure of a pixel will be described with reference to FIG. 4. Additionally, FIG. 4 shows a cross sectional positional relationship of each constituent element, and displays the constituent elements at a scale at which each element can be clearly recognized.

As shown in FIG. 4, firstly, the scanning line 3a is formed on the base material 10s of the element substrate 10. The scanning line 3a can, for example, use a metal element, an alloy, a metal silicide, a polysilicide or a component in which these are laminated, which include at least one metal such as Al (aluminum), Ti (titanium), Cr (chromium), W (tungsten), Ta (tantalum) and Mo (molybdenum), has a light-shielding property.

A first insulation film (a ground insulation film) 11a that is formed from silicon oxide or the like is formed so as to cover the scanning line 3a, and a semiconductor layer 30a is formed in island form on the first insulation film 11a. For example, the semiconductor layer 30a forms a LDD (Lightly Doped Drain) structure which is formed from a polycrystalline silicon film or the like, into which impure ions are injected, and which includes a data line side source and drain region, a bonding region, a channel region, a bonding region, and a pixel electrode side source and drain region.

A second insulation film (a gate insulation film) 11b is formed so as to cover the semiconductor layer 30a. Furthermore, a gate electrode 30g is formed in a position that faces the channel region interposing the second insulation film 11b.

A third insulation film 11c is formed in a manner that covers the gate electrode 30g and the second insulation film 11b, and two contact holes CNT1 and CNT2, which penetrate through the second insulation film 11b and the third insulation film 11c, are formed in positions that overlap the respective end sections of the semiconductor layer 30a.

Further, a conductive film is formed to fill in the two contact holes CNT1 and CNT2 and cover the third insulation film 11c, using a conductive material that has a light-shielding property such as Al (aluminum) or an alloy thereof, and a source electrode 31, which is connected to the data line side source and drain region through the contact hole CNT1, and the data line 6a are formed as a result of patterning the conductive film. A drain electrode 32 (a first relay electrode 6b) that is connected to the pixel electrode side source and drain region through the contact hole CNT2 is formed simultaneously.

Next, a first interlayer insulation film 12 is formed covering the data line 6a, the first relay electrode 6b and the third insulation film 11c. The first interlayer insulation film 12 is, for example, formed from an oxide or a nitride of silicon. Further, a flattening treatment that flattens out unevenness in the surface that occur as a result of covering the region in which the TFT 30 is provided, is carried out. For example, a Chemical Mechanical Polishing treatment (a CMP treatment) or a spin coating treatment can be used as a method of the flattening treatment.

A contact hole CNT3, which penetrates through the first interlayer insulation film 12, is formed in a position that overlaps with the first relay electrode 6b. A conductive film, which is formed from a metal that has a light-shielding property such as Al (aluminum) or an alloy thereof, for example, is formed to coat the contact hole CNT3 and cover the first interlayer insulation film 12, and wiring 7a and a second relay electrode 7b, which is electrically connected to the first relay electrode 6b through the contact hole CNT3, are formed as a result of patterning the conductive film.

The wiring 7a is formed so as to overlap with the semiconductor layer 30a of the TFT 30 and the data line 6a in a planar manner, and functions as a shield layer to which a fixed potential is applied.

A second interlayer insulation film 13a is formed so as to cover the wiring 7a and the second relay electrode 7b. For example, the second interlayer insulation film 13a can also use an oxide or a nitride, or an oxynitride of silicon, and a flattening treatment such as a CMP treatment is carried out thereon.

A contact hole CNT4 is formed in a position that overlaps with the second relay electrode 7b of the second interlayer insulation film 13a. A conductive film, which is formed from a metal that has a light-shielding property such as Al (aluminum) or an alloy thereof, for example, is formed to coat the contact hole CNT4 and cover the second interlayer insulation film 13a, and a first capacity electrode 16a and a third relay electrode 16d are formed as a result of patterning the conductive film.

An insulation film 13b is formed using patterning so as to cover the outer periphery of a portion of the first capacity electrode 16a that faces a second capacity electrode 16c through a dielectric layer 16b, which is formed later. In addition, the insulation film 13b is formed using patterning so as to cover the outer periphery of the third relay electrode 16d except for a portion that overlaps with a contact hole CNT5.

The dielectric layer 16b is formed covering the insulation film 13b and the first capacity electrode 16a. A single-layered film such as a silicon nitride film, hafnium oxide ($HfO_2$), alumina ($Al_2O_3$), or tantalum oxide ($Ta_2O_5$), or a multi-layered film in which at least two of these single-layered films are laminated, may be used as the dielectric layer 16b. The dielectric layer 16b of a portion that overlaps with the third relay electrode 16d in a planar manner, is removed using etching or the like.

For example, a conductive film such as TiN (titanium nitride), is formed to cover the dielectric layer 16b, and the second capacity electrode 16c, which is disposed facing the first capacity electrode 16a, and is connected to the third relay electrode 16d, is formed as a result of patterning the conductive film. The capacity element 16 is configured by the dielectric layer 16b, and the first capacity electrode 16a and second capacity electrode 16c that are formed facing one another interposing the dielectric layer 16b therebetween.

Next, a third interlayer insulation film 14 that covers the second capacity electrode 16c and the dielectric layer 16b is formed. For example, the third interlayer insulation film 14 is also formed from an oxide or a nitride of silicon, and a flattening treatment such as a CMP treatment is carried out thereon. The contact hole CNT5, which penetrates through the third interlayer insulation film 14 so that the second capacity electrode 16c comes into contact with the third relay electrode 16d, is formed.

A transparent conductive film (an electrode film) such as ITO is formed to coat the contact hole CNT5 and cover the third interlayer insulation film 14. The pixel electrode 15, which is electrically connected to the second capacity electrode 16c and the third relay electrode 16d through the contact hole CNT5 is formed as a result of patterning the transparent conductive film (the electrode film).

The second capacity electrode 16c is electrically connected to the drain electrode 32 of the TFT 30 through the third relay electrode 16d, the contact hole CNT4, the second relay electrode 7b, the contact hole CNT3, and the first relay electrode 6b, and is electrically connected to the pixel electrode 15 through the contact hole CNT5.

The first capacity electrode 16a is formed so as to span a plurality of pixels P, and functions as the capacity line 3b in the equivalent circuit (refer to FIG. 3). A fixed potential is applied to the first capacity electrode 16a. As a result of this, it is possible to maintain a potential that is applied to the pixel electrode 15 through the drain electrode 32 of the TFT 30, between the first capacity electrode 16a and the second capacity electrode 16c.

In this manner, a plurality of pieces of wiring are formed on the base material 10s of the element substrate 10, and wiring layers are represented using the reference numerals of the insulation films and interlayer insulation films that insulate pieces of wiring from one another. That is, the first insulation film 11a, the second insulation film 11b and the third insulation film 11c are collectively referred to as a wiring layer 11. The scanning line 3a is representative wiring of the wiring layer 11. The data line 6a is representative wiring of the wiring layer.

The second interlayer insulation film 13a, the insulation film 13b and the dielectric layer 16b are collectively referred to as a wiring layer 13, and the wiring 7a is representative wiring thereof. In the same manner, the first capacity electrode 16a (the capacity line 3b) is representative wiring of the wiring layer 13.

The alignment film 18 is formed so as to cover the pixel electrode 15, and the alignment film 24 is formed so as to cover the facing electrode 23 of the facing substrate 20, which is disposed facing the element substrate 10 through the liquid crystal layer 50. In the manner mentioned above, the alignment films 18 and 24 are inorganic orientation films, and are formed from aggregates of columns 18a and 24a, which, for example, are grown in pillar from by depositing an inorganic material such as silicon oxide in an oblique manner from a predetermined direction.

Liquid crystal molecules LC that have negative dielectric anisotropy with respect to the alignment films 18 and 24, are aligned in a substantially vertical manner (VA; Vertical Alignment) having a pretilt angle $\theta$ of 3° to 5° in an inclination direction of the columns 18a and 24a with respect to a normal line direction of an orientation film surface. The liquid crystal molecules behave (vibrate) so as to become inclined in a direction of an electric field that is generated between the pixel electrode 15 and the facing electrode 23 as a result of the liquid crystal layer 50 being driven due to the application of an AC voltage (a driving signal and an AC signal) between the pixel electrode 15 and the facing electrode 23.

Figure 5:
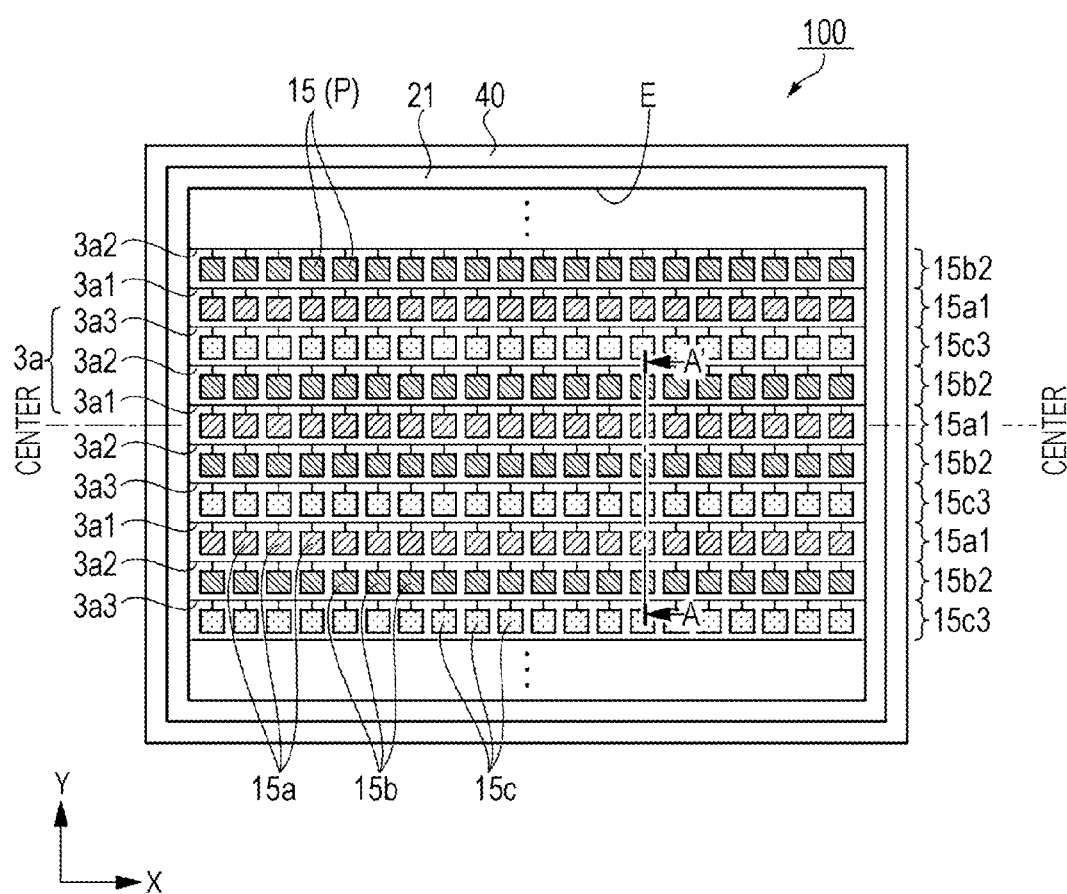
FIG. 5 is a schematic plan view of the liquid crystal device for describing a method with which a voltage is applied to pixel electrodes.
Figure 6:
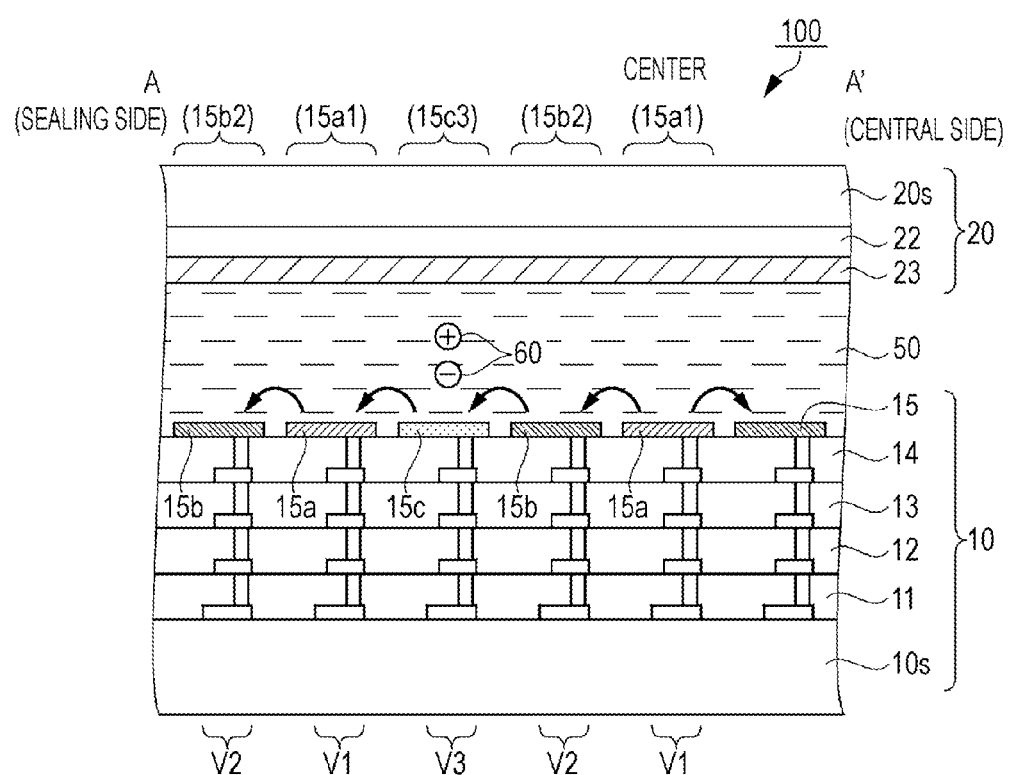
FIG. 6 is a schematic cross-sectional view along a line A-A' of the liquid crystal device that is shown in FIG. 5.

FIG. 5 is a schematic plan view of the liquid crystal device for describing a method with which a voltage is applied to pixel electrodes. FIG. 6 is a schematic cross-sectional view along a line A-A' of the liquid crystal device that is shown in FIG. 5. Hereinafter, a method with which a voltage is applied to pixel electrodes of the liquid crystal device will be described with reference to FIGS. 5 and 6.

As shown in FIG. 5, the liquid crystal device 100 includes the display region E, in which pixels P that contribute to display are disposed, and the break line section 21, which surrounds the display region E. The sealing material 40 is disposed in frame form at the periphery of the break line section 21. A plurality of pixel electrodes 15 are disposed in the display region E in matrix form.

For example, a plurality of scanning lines 3a that are electrically connected to the scanning line driving circuit 102 (refer to FIG. 1) are formed on the element substrate 10 of the liquid crystal device 100 extending along the long edge (the X direction) in the display region E. In the above-mentioned manner, a plurality of pixel electrodes 15 (15a, 15b and 15c) that are arranged along an extension direction of the scanning lines 3a, are electrically connected to each scanning line 3a. Further, an AC signal is supplied to each pixel electrode 15 from the scanning line driving circuits 102.

In the present embodiment, since the AC signal is applied to each scanning line 3a using a line inversion driving technique, it is difficult for domains to be generated in comparison with a case of a dot inversion driving technique. In addition, it is possible to use application methods that have been used in the related art.

For example, a plurality of first pixel electrodes 15a are electrically connected to a first scanning line 3a1, as first wiring. A plurality of second pixel electrodes 15b are electrically connected to a second scanning line 3a2, as second wiring. A plurality of third pixel electrodes 15c are electrically connected to a third scanning line 3a3, as third wiring.

In this instance, a region that surrounds the plurality of first pixel electrodes 15a, which are electrically connected to the first scanning line 3a1, is set as a first pixel electrode region 15a1. In addition, a region that surrounds the plurality of second pixel electrodes 15b, which are electrically connected to the second scanning line 3a2, is set as a second pixel electrode region 15b2. In addition, a region that surrounds the plurality of third pixel electrodes 15c, which are electrically connected to the third scanning line 3a3, is set as a third pixel electrode region 15c3.

As shown in FIG. 6, the element substrate 10 of the liquid crystal device 100 includes a plurality of wiring layers on the base material 10s. The plurality of pixel electrodes 15 are provided on the third interlayer insulation film 14. Each pixel electrode 15 is electrically connected to the scanning lines 3a through an interlayer insulation film and a wiring layer of a lower layer that are provided in a relay electrode or the like.

For example, the width of the pixel electrodes 15 is 7.5 μm. For example, a gap between adjacent pixel electrodes 15 is 0.5 μm.

When ionic impurities 60, which remain in the display region E, are swept to an outer side of the display region E from the display region E, an AC signal is applied to the pixel electrodes 15 (15a, 15b and 15c) so that a direction of an electric field (a line of electric force) that is generated between adjacent pixel electrodes 15 migrates to a direction of an outer side (a sealing material 40 side) of the display region E from the center of the display region E.

The AC signal is a signal that transitions between a high potential and a low potential with a common potential (LCCOM) that is applied to the facing electrode 23 as a reference potential thereof. Positive polarity (+) or negative polarity (−) ionic impurities 60 are swept up to an outer side of the display region E in accordance with the migration of the above-mentioned electric field direction to a pixel electrode 15 (for example, the second pixel electrode 15b) from a pixel electrode 15 (for example, the first pixel electrode 15a).

Hereinafter, a specific driving method will be described with reference to FIGS. 7 to 9.

(Driving Method of Liquid Crystal Device)

Figure 7:
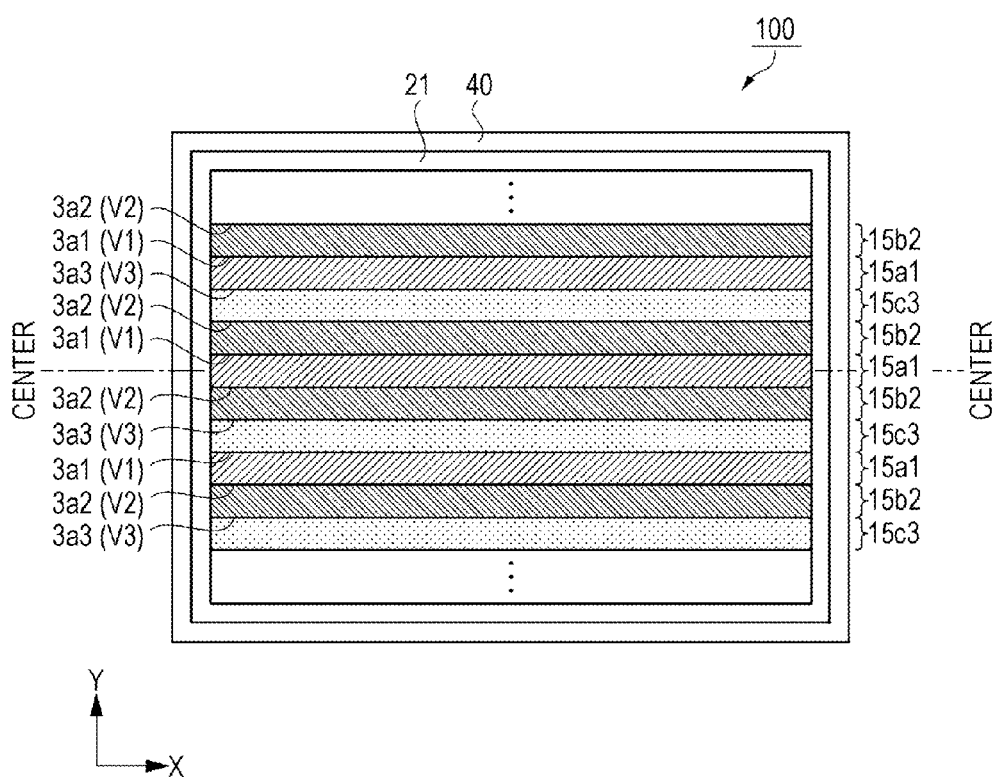
FIG. 7 is a schematic plan view that shows types of AC signal that are applied to each scanning line.

FIG. 7 is a schematic plan view that shows types of AC signal that are applied to each scanning line. FIG. 8 is a timing chart that shows each AC signal. FIG. 9 is a schematic plan view that shows polarities of AC signals that are applied to pixel electrodes in the display region for each screen. Hereinafter, an application method of an AC signal and a timing chart will be described with reference to FIGS. 7 to 9.

In the abovementioned manner, regions of a plurality of pixel electrodes 15 that are electrically connected to a single scanning line 3a, are set as pixel electrode regions. A central pixel electrode region of the comparative example of the display region E is set as the first pixel electrode region 15a1. In the display region E, pixel electrode regions are repeatedly disposed in the order of the second pixel electrode region 15b2 and the third pixel electrode region 15c3 toward a longitudinal direction of the sealing material 40 with the central first pixel electrode region 15a1 set as a center thereof.

For example, pixel electrode regions are disposed in the order of the second pixel electrode region 15b2, the third pixel electrode region 15c3 and another first pixel electrode region 15a1 in one direction (for example, downward in FIG. 7) of the central first pixel electrode region 15a1 of the display region E.

Pixel electrode regions are also disposed in the order of the second pixel electrode region 15b2, the third pixel electrode region 15c3 and a subsequent first pixel electrode region 15a1 in the other direction (for example, upward in FIG. 7) of the central first pixel electrode region 15a1.

An AC signal V1, as a first signal, is applied to the first pixel electrode regions 15a1 (the first scanning lines 3a1). An AC signal V2, as a second signal, is applied to the second pixel electrode regions 15b2 (the second scanning lines 3a2). An AC signal V3, as a third signal, is applied to the third pixel electrode regions 15c3 (the third scanning lines 3a3).

Figure 8:
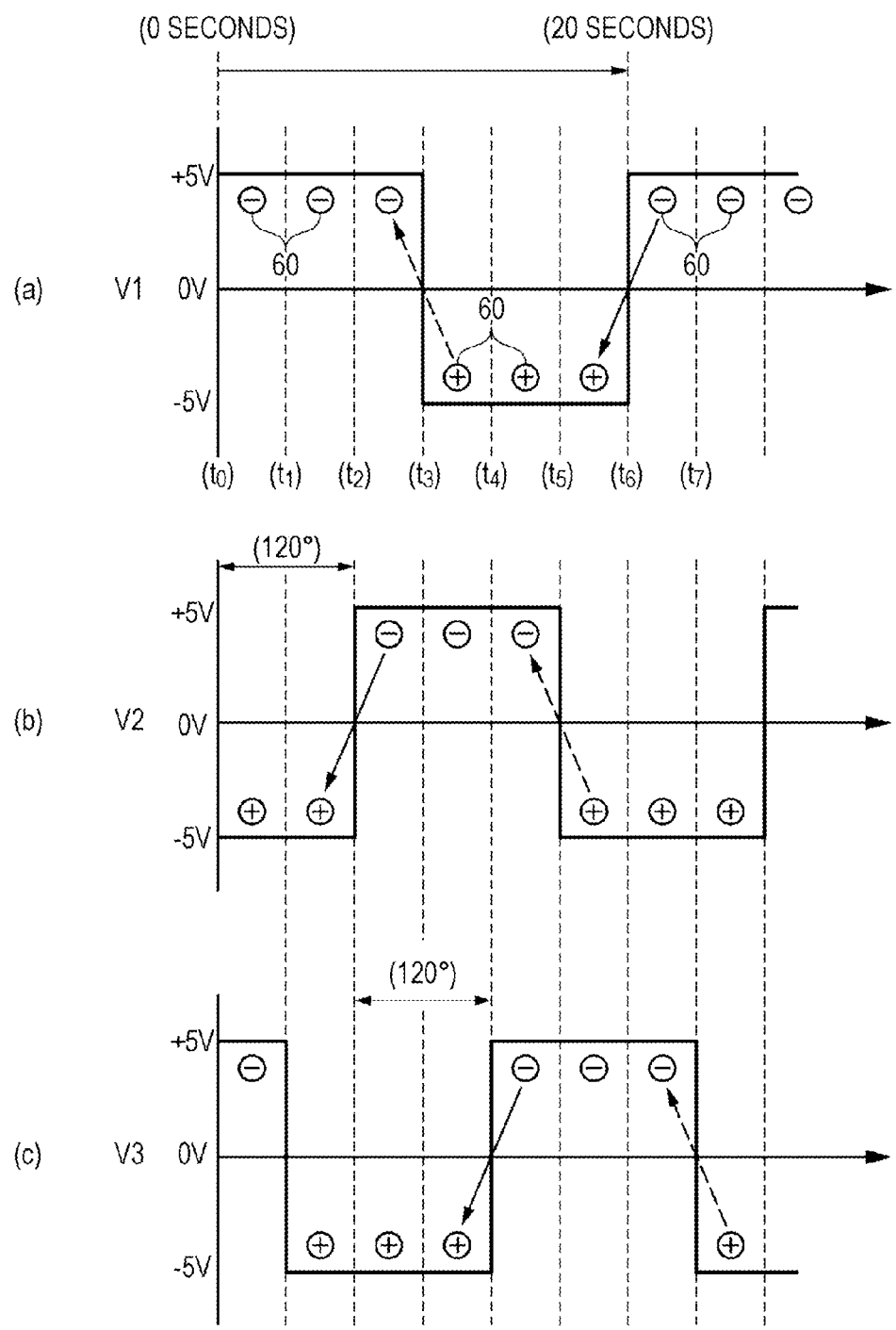
FIG. 8 is a timing chart that shows each AC signal.

The drawings that are shown in FIG. 8 show timing charts of the AC signals V1, V2 and V3. A 5 V rectangular wave AC signal is applied to each pixel electrode 15a, 15b and 15c of each pixel electrode region 15a1, 15b2 and 15c3. For example, the frequency thereof is 10 mHz to 50 mHz. In a case of 50 mHz, the time of 1 period of the AC signal is 20 seconds.

As a prerequisite of the above-mentioned frequency, firstly, the facing electrode 23 is disposed in a position that faces the pixel electrodes 15 at room temperature. The 5 V AC signal (5 V to −5 V) is applied between the pixel electrodes 15. In the abovementioned manner, for example, the width of the pixel electrodes 15 is 7.5 μm. For example, a gap between the pixel electrodes 15 is 0.5 μm. For example, a cell gap is 2.5 μm.

Additionally, it is preferable that the frequency is 10 mHz to 50 mHz, but if the frequency is too low, a state that is the same as a circumstance in which a direct current is applied between the pixel electrodes 15 and the facing electrode 23 is attained, and there is a concern that display defects such as breakdown, burn-in or smearing of the liquid crystal will occur.

In addition, if the frequency is too high, the ionic impurities 60 are not able to follow the scrolling (the migration velocity) of the electric field, and therefore, there is a concern that it will not be possible to sweep the ionic impurities 60.

The AC signal V2, in which the phase is delayed by 120° with respect to the AC signal V1, which is applied to the first pixel electrode regions 15a1, is applied to the pixel electrodes 15b of the second pixel electrode regions 15b2. The AC signal V3, in which the phase is delayed by 120° with respect to the AC signal V2, which is applied to the second pixel electrode regions 15b2, is applied to the pixel electrodes 15c of the third pixel electrode regions 15c3.

In other words, the AC signals V1, V2 and V3 are applied so that the phases are delayed by 120° each toward the outer side of the display region E (a long edge side of the sealing material 40) from the first pixel electrode region 15a1, which is in the center of the display region E.

In addition, the AC signal V1 is applied again to the first pixel electrode regions 15a1 that are on an outer side of the third pixel electrode region 15c3. In the same manner, the AC signal V2 is applied to the second pixel electrode regions 15b2. In other words, the same AC signal is repeatedly applied every 3 scanning lines.

Figure 9:
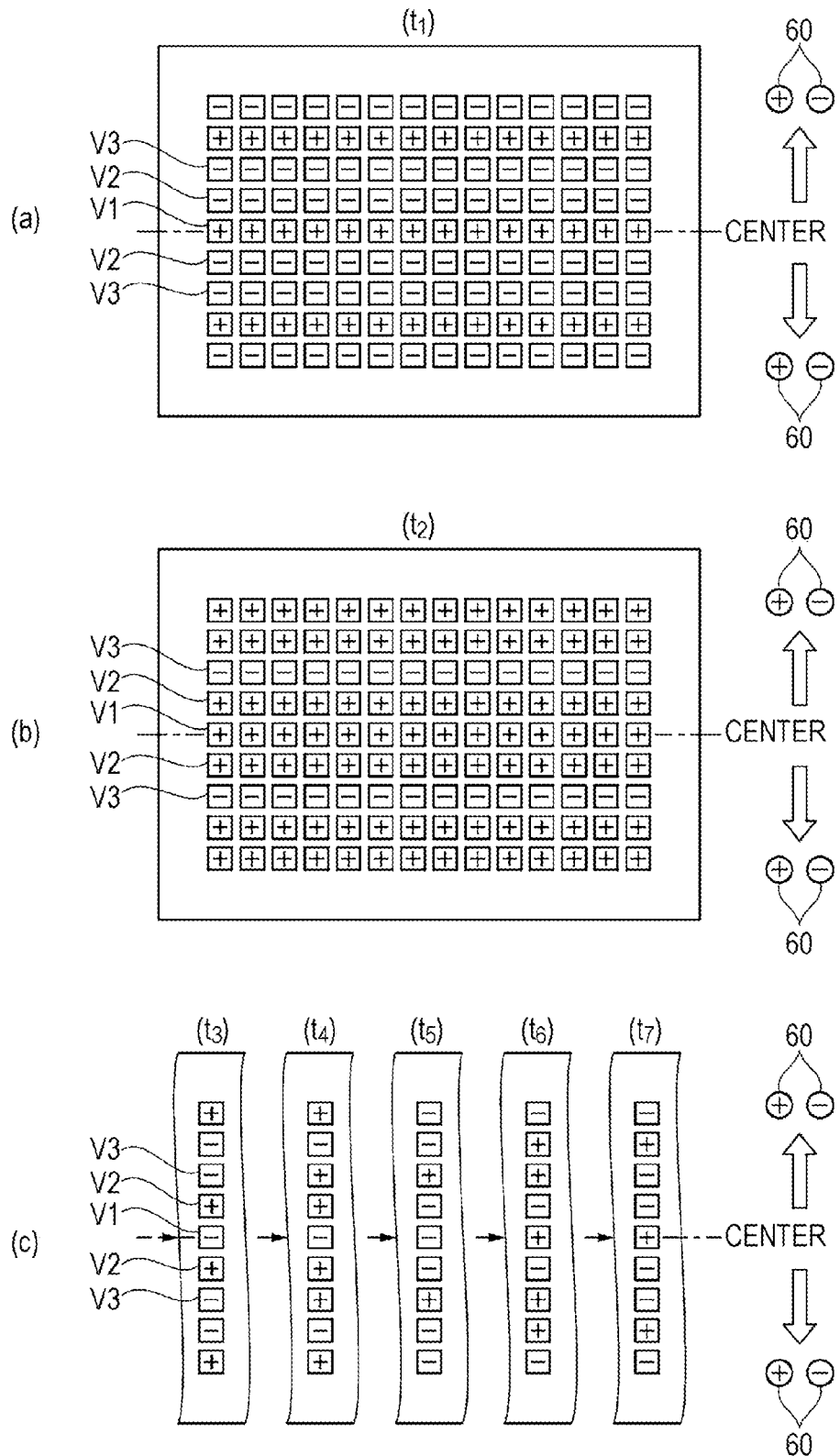
FIG. 9 is a schematic plan view that shows polarities of AC signals that are applied to pixel electrodes for each screen.

More specifically, as shown in (a) of FIG. 9, the AC signals V1, V2 and V3 are applied so that the potentials of the pixel electrodes 15a of the central first pixel electrode region 15a1 are positive polarities (+), the potentials of the pixel electrodes 15b of the adjacent second pixel electrode region 15b2 are negative polarities (−), and the potentials of the pixel electrodes 15c of the third pixel electrode region 15c3 that is adjacent thereto are negative polarities (−), and, thereafter, in the same manner, the potentials of the pixel electrodes 15a of the first pixel electrode regions 15a1 are positive polarities (+), the potentials of the pixel electrodes 15b of the second pixel electrode regions 15b2 are negative polarities (−), and the potentials of the pixel electrodes 15c of the third pixel electrode regions 15c3 are negative polarities (−).

For example, if a 5 V AC signal is applied in the above-mentioned manner, the potential of a positive polarity (+) is 5 V. For example, the potential of a negative polarity (−) is −5 V.

Additionally, the rectangular wave AC signals V1, V2 and V3 that are shown in FIG. 8 transition between a high potential (5 V) and a low potential (−5 V) with a reference potential set as 0 V, but the setting of the reference potential, the high potential and the low potential is not limited to such a configuration.

In addition, a difference between a temporal average and a reference potential of the AC signals V1, V2 and V3 that are applied is substantially 0 V. More specifically, it is preferable that the difference is 100 mV or less. In a case in which the difference is 100 mV or more, there is a concern that burn-in will occur. It is difficult for burn-in to occur at 100 mV or less.

It is possible that ionic impurities that have a positive polarity (+) and ionic impurities that have a negative polarity (−) are present in the ionic impurities 60. Accordingly, it is possible for positive polarity and negative polarity ionic impurities 60 to successively migrate to an operation unit of the display region E from the center of the display region E as a result of continuing application of the AC signal V1 to the pixel electrodes 15a of the first pixel electrode regions 15a1, the AC signal V2 to the pixel electrodes 15b of the second pixel electrode regions 15b2, and the AC signal V3 to the pixel electrodes 15c of the third pixel electrode regions 15c3.

More specifically, as shown in FIG. 8, since minus ionic impurities 60 are swept to a positive polarity (+) potential, it is possible to sweep minus ionic impurities 60 that remain in the display region E toward the outer side of the display region E. In the same manner, since plus ionic impurities 60 are swept to a negative polarity (−) potential, it is possible to sweep plus ionic impurities 60 that remain in the display region E toward the outer side of the display region E.

In this manner, since the AC signals V1, V2 and V3 are applied so that the phases of the second scanning lines 3a2 are delayed with respect to those of the first scanning lines 3a1, and the phases of the third scanning lines 3a3 are delayed with respect to those of the second scanning lines 3a2, the distribution of the electric field that is generated between each pixel electrode 15 migrates toward a direction of the third scanning lines 3a3 from the first scanning lines 3a1. As a result of this, it is possible to sweep up the ionic impurities 60 that are included inside the liquid crystal layer 50 in the direction of the third scanning lines 3a3 from the first scanning lines 3a1.

In addition, as shown in FIG. 9, the number of signals that have mutually different phases is 3. The AC signal, which controls the phases repeats six sequences ((V1, V2, V3): t1 (+, −, −), t2 (+, +, −), t3 (−, +, −), t4 (−, +, +), t5 (−, −, +) and t6 (+, −, +)). As a result of this, positive polarities (+) and negative polarities (−) are successively shifted to the outer side of the display region E. Additionally, an infinite loop is formed at the two scanning lines 3a at the outermost periphery of the display region E, and the ionic impurities 60 are trapped.

In addition, in the present embodiment, since the difference in potential is created by changing the phases, it is possible to increase the intensity of the electric field beyond that of a method that, for example, creates the difference in potential by changing the amplitude at 5V, and therefore, it is possible to more effectively sweep up the ionic impurities 60.

(Configuration of Electronic Apparatus)

Figure 10:
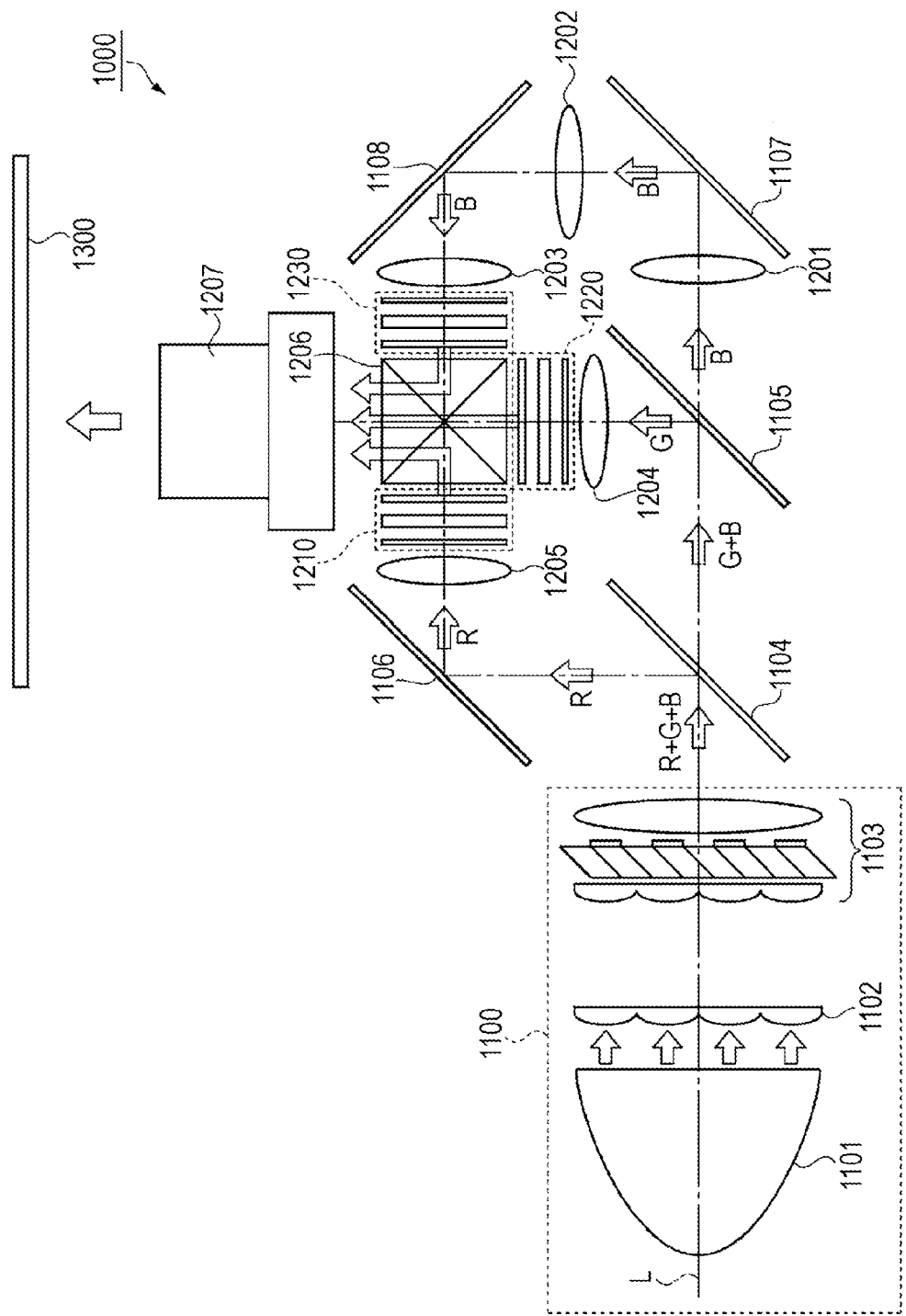
FIG. 10 is a schematic diagram that shows a configuration of a projection type display device that is provided with a liquid crystal device.

Next, a projection type display device will be described as an electronic apparatus of the present embodiment with reference to FIG. 10. FIG. 10 is a schematic diagram that shows a configuration of a projection type display device that is provided with the above-mentioned liquid crystal device.

As shown in FIG. 10, a projection type display device 1000 of the present embodiment is provided with a polarized light illumination device 1100 that is disposed along a system optical axis L, two dichromatic mirrors 1104 and 1105, as optical isolation elements, three reflective mirrors 1106, 1107 and 1108, five relay lenses 1201, 1202, 1203, 1204 and 1205, three transmissive liquid crystal light bulbs 1210, 1220 and 1230, as optical modulation means, a cross dichroic prism 1206, as an optical synthesis element and a projection lens 1207.

The polarized light illumination device 1100 has a schematic configuration which includes a lamp unit 1101, as a light source that is formed from a white light source such as an ultrahigh pressure mercury lamp or a halogen lamp, an integrator lens 1102 and a polarized light conversion element 1103.

Among polarized light beams that are emitted from the polarized light illumination device 1100, the dichromatic mirror 1104 reflects red light (R) and transmits green light (G) and blue light (B). The other dichromatic mirror 1105 reflects green light (G) that is transmitted by the dichromatic mirror 1104, and transmits blue light (B).

The red light (R) that is reflected by the dichromatic mirror 1104 is caused to be incident to the liquid crystal light bulb 1210 via the relay lens 1205 after being reflected by the reflective mirror 1106. The green light (G) that is reflected by the dichromatic mirror 1105 is caused to be incident to the liquid crystal light bulb 1220 via the relay lens 1204. The blue light (B) that is transmitted by the dichromatic mirror 1105 is caused to be incident the liquid crystal light bulb 1230 via an optical guide system that is formed from the three relay lenses 1201, 1202 and 1203 and the two reflective mirrors 1107 and 1108.

The liquid crystal light bulbs 1210, 1220 and 1230 are respectively disposed facing incidence surfaces for each color of light of the cross dichroic prism 1206. The color of light that is incident to the liquid crystal light bulbs 1210, 1220 and 1230 is adjusted on the basis of image information (an image signal), and is emitted toward the cross dichroic prism 1206.

This prism is configured by bonding four right angle prisms together, and forming a dielectric multilayer that reflects red light and a dielectric multilayer that reflects blue light in cross form on the inside thereof. The three types of colored light are synthesized by these dielectric multilayers, and light that can render a color image is synthesized. The synthesized light is projected on a screen 1300 by the projection lens 1207, which is an optical projection system, and an image is enlarged and displayed.

The liquid crystal light bulb 1210 uses a liquid crystal light bulb in which the liquid crystal device 100 described above is adopted. The liquid crystal device 100 is placed and disposed in a gap between a pair of polarization elements that are disposed in crossed Nichol form on the incidence side and the emission side of colored light. The same applies to the other liquid crystal light bulbs 1220 and 1230.

According to such a projection type display device 1000, since the liquid crystal light bulbs 1210, 1220 and 1230 are used, it is possible to obtain high electrical reliability.

Additionally, in addition to the projection type display device 1000, as an electronic apparatus in which the liquid crystal device 100 is mounted, it is possible to use various electronic apparatuses such as an Electrical View Finder (EVF), a mobile mini-projector, a heads-up display, a smart phone, a mobile telephone, a mobile computer, a digital camera, a digital video camera, a display, an in-vehicle apparatus, an audio apparatus, an exposure device or an illumination device.

As described in detail above, according to the driving method of the liquid crystal device 100, the liquid crystal device 100 and the electronic apparatus of the first embodiment, it is possible to obtain the effects indicated below.

(1) According to the driving method of the liquid crystal device 100, and the liquid crystal device 100 of the first embodiment, since the AC signal V1 is applied to the first scanning lines 3a1, the AC signal V2, the phase of which is delayed with respect to the AC signal V1, is applied to the second scanning lines 3a2, and the AC signal V3, the phase of which is delayed with respect to the AC signal V2, is applied to the third scanning lines 3a3, the distribution of the electric fields, which are generated between the first pixel electrodes 15a and the second pixel electrodes 15b, and between the second pixel electrodes 15b and the third pixel electrodes 15c, migrate toward the direction of the third scanning lines 3a3 from the first scanning lines 3a1. As a result of this, it is possible to sweep up the ionic impurities 60 that are included inside the liquid crystal layer 50 in the direction of the third scanning lines 3a3 from the first scanning lines 3a1. In addition, since the AC signals V1, V2 and V3 transition between a high potential and a low potential with respect to a reference potential, (−) ionic impurities 60 are swept up in a case in which a (+) potential is applied to the pixel electrodes 15, and (+) ionic impurities 60 are swept up in a case in which a (−) potential is applied to the pixel electrodes 15. Since an electric field migrates toward a direction of the third scanning lines 3a3 from the first scanning lines 3a1 as a result of applying such a signal, it is possible to sweep up both (+) and (−) ionic impurities 60.

(2) According to the driving method of the liquid crystal device 100, and the liquid crystal device 100 of the first embodiment, since an AC signal of 10 mHz to 50 mHz is applied to each scanning line 3a, it is possible to follow migration of the ionic impurities 60, and therefore, it is possible to more effectively sweep the ionic impurities 60 in an outer peripheral direction of the display region E from the center of the display region E.

(3) According to the driving method of the liquid crystal device 100, and the liquid crystal device 100 of the first embodiment, since the second scanning lines 3a2 and the third scanning lines 3a3 are disposed toward an outer side of the display region E effective pixel region with the first scanning line 3a1, which is in the center of the display region E, as a boundary, and the ionic impurities 60 are swept toward a direction of the third scanning lines 3a3 from the first scanning lines 3a1, or in other words, the ionic impurities 60 are swept along a short edge, it is possible to sweep rapidly in comparison with a method that sweeps along a long edge.

(4) According to the driving method of the liquid crystal device 100, and the liquid crystal device 100 of the first embodiment, since the alignment films 18 and 24, which are formed from an inorganic material, are provided on the element substrate 10 and the facing substrate 20, and it is easy for the alignment films 18 and 24 to absorb the ionic impurities 60, it is easy for display defects such as display irregularities and burn-in to occur. However, since the ionic impurities 60 are swept up as a result of an AC signal in which the phases differ for each scanning line 3a, being applied, it is possible to suppress a circumstance in which display defects occur.

(5) According to the electronic apparatus of the first embodiment, since the electronic apparatus is provided with the above-mentioned liquid crystal device 100, it is possible to provide an electronic apparatus in which reductions in display quality are suppressed.

Second Embodiment

Figure 11:
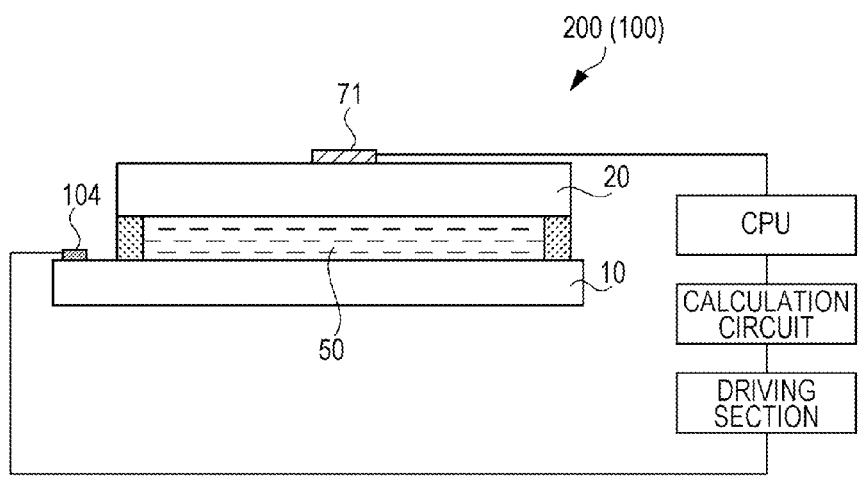
FIG. 11 is a schematic cross-sectional view that shows a structure of a liquid crystal device of a second embodiment.
Figure 12:
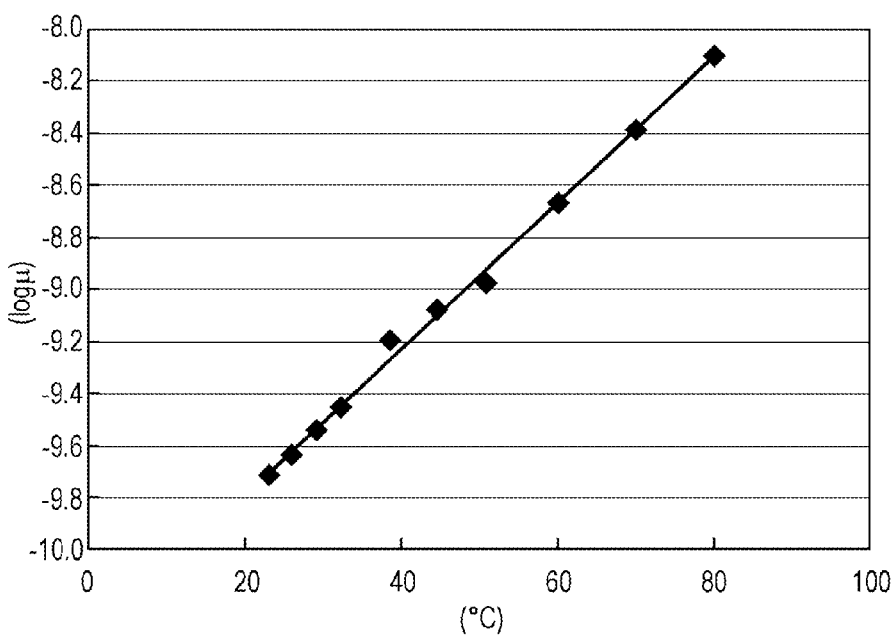
FIG. 12 is a graph that shows a relationship between a migration amount μ of ionic impurities and the temperature.

Configuration of Liquid Crystal Device and Driving Method of Liquid Crystal Device FIG. 11 is a schematic cross-sectional view that shows a structure of a liquid crystal device of a second embodiment. FIG. 12 is a graph that shows a relationship between a migration amount $\mu$ of ionic impurities and the temperature. Hereinafter, a configuration of a liquid crystal device and a relationship between a migration amount $\mu$ of ionic impurities and the temperature will be described with reference to FIGS. 11 and 12.

A liquid crystal device 200 of the second embodiment differs from the above-mentioned liquid crystal device 100 of the first embodiment in that the liquid crystal device 200 is provided with a temperature sensor 71 for measuring the temperature of the liquid crystal panel 110, and other portions are largely the same. Therefore, in the second embodiment, portions that differ from the first embodiment will be described in detail, and description of the other overlapping portions will be omitted as appropriate.

As shown in FIG. 11, the liquid crystal device 200 of the second embodiment is provided with the temperature sensor 71 for measuring the temperature of the liquid crystal panel 110, a CPU that converts information obtained by the temperature sensor 71 into a temperature of the liquid crystal panel 110, a calculation circuit that calculates an optimum frequency using the temperature, and a driving section that drives the liquid crystal panel 110 on the basis of information of the calculation circuit.

The temperature sensor 71 is attached to the surface of the liquid crystal panel 110 (in particular, a portion that is close to the temperature of the liquid crystal layer 50) by bonding. For example, as the temperature sensor 71, a thermocouple can be used.

In the graph that is shown in FIG. 12, the horizontal axis is the temperature of the ionic impurities 60, and the temperature becomes higher in accordance with movement to the right side. The vertical axis is a migration amount of the ionic impurities 60, and shows a value of log $\mu$.

The migration amount $\mu$ (a migration velocity v) of the ionic impurities 60 is dependent upon temperature. Accordingly, if the temperature is higher than a normal temperature when the liquid crystal device 200 is driven in a practical sense, the effect of sweeping the ionic impurities 60 is obtained even if the frequency (10 mHz to 50 mHz) is set to be high.

The log μ can be determined using the following equation. Additionally, T is the temperature ° C.

$$\log \mu = 0.0282T - 10.357$$

The value of the migration amount μ of the ionic impurities 60 when the temperature is room temperature (for example, 25° C.) is approximately −9.6 in a value of log μ. In contrast to this, the value of the migration amount μ of the ionic impurities 60 when the temperature is 60° C. is −8.7 in a value of log μ. In other words, the migration amount μ of the ionic impurities 60 at 60° C. is approximately 10 times that at 25° C. The reason for focusing on a temperature of 60° C. is that this is considered to be a temperature during use of the liquid crystal device 200 as a light bulb of the projection type display device 1000.

In the above-mentioned manner, if the temperature of the projection type liquid crystal device 1000 rises, the migration amount of the ionic impurities 60 also rises. More specifically, for example, it is possible to sweep ionic impurities 60 to which an AC signal of 50 mHz is applied at room temperature, even if an AC signal of 500 mHz is applied.

In this manner, for example, since the migration amount μ of the ionic impurities 60 is greater when the temperature of the ionic impurities 60 increases due to projection light of the projection type display device 1000, it is desirable that the frequencies of the AC signals V1, V2 and V3 that are applied to the pixel electrodes 15 are set to be high. As a result of this, it is possible to sweep the ionic impurities 60 more effectively. In addition, it is possible to reduce a risk of burn-in.

As described in detail above, according to the driving method of the liquid crystal device 200, and the liquid crystal device 200 of the second embodiment, it is possible to obtain the effect indicated below in addition to the effects of (1) to (4) mentioned above.

(6) According to the driving method of the liquid crystal device 200, and the liquid crystal device 200 of the second embodiment, since the frequencies of the AC signal V1, the AC signal V2 and the AC signal V3 are changed depending on the temperature of the liquid crystal panel 110, it is possible to cause the distribution of the electric field to follow the migration of the ionic impurities 60 even if the migration amount changes due to the temperature of the ionic impurities 60. In a case in which the temperature is high, it is possible to perform sweeping rapidly. In addition, it is possible to reduce a risk of burn-in.

Third Embodiment

Figure 13:
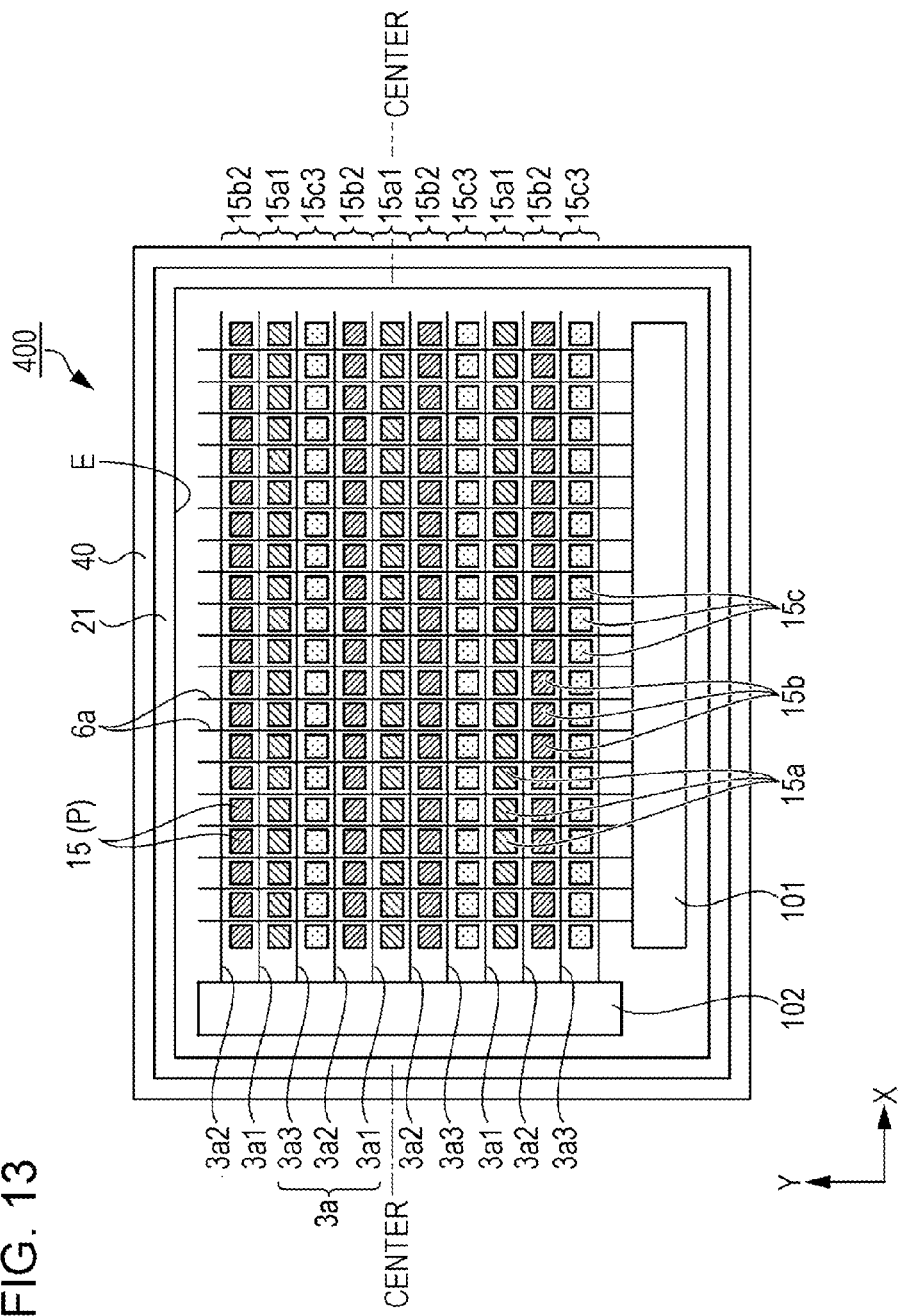
FIG. 13 is a schematic plan view for describing a method with which a voltage is applied to pixel electrodes of a liquid crystal device of a third embodiment.

Configuration of Liquid Crystal Device and Driving Method of Liquid Crystal Device FIG. 13 is a schematic plan view for describing a method with which a voltage is applied to pixel electrodes of a liquid crystal device of a third embodiment. Hereinafter, a configuration of a liquid crystal device and a driving method of the liquid crystal device will be described with reference to FIG. 13 for the most part.

A liquid crystal device 400 of the third embodiment differs from the above-mentioned liquid crystal device 100 of the first embodiment in that a portion of the driving method thereof is different, and other portions are largely the same. Therefore, in the third embodiment, portions that differ from the first embodiment will be described in detail, and description of the other overlapping portions will be omitted as appropriate.

As shown in FIG. 3, in the display region E, the liquid crystal device 400 of the third embodiment includes at least a plurality of scanning lines 3a and a plurality of data lines 6a that are mutually insulated from and are orthogonal to one another, and capacity lines 3b that are disposed in parallel along the data lines 6a.

The scanning lines 3a are electrically connected to gates of the TFTs 30, and the data lines 6a are electrically connected to data line side source and drain regions (one source and drain region) of the TFTs 30. The pixel electrodes 15 are electrically connected to pixel electrode side source and drain regions (another source and drain region) of the TFTs 30.

Next, the driving method of the liquid crystal device 400 of the third embodiment will be described. A region of a plurality of pixel electrodes 15a that are electrically connected to the first scanning line 3a1 via the TFTs 30 is referred to as a first pixel electrode region 15a1. A region of a plurality of pixel electrodes 15b that are electrically connected to the second scanning line 3a2 via the TFTs 30 is referred to as a second pixel electrode region 15b2. A region of a plurality of pixel electrodes 15c that are electrically connected to the third scanning line 3a3 via the TFTs 30 is referred to as a third pixel electrode region 15c3.

In the display region E, pixel electrode regions are repeatedly arranged in the order of the second pixel electrode region 15b2 and the third pixel electrode region 15c3 toward a longitudinal direction of the sealing material 40 with the central first pixel electrode region 15a1 set as a center thereof.

Firstly, the TFTs 30 are set to an ON state for a fixed period of time by supplying a scanning signal (a first signal) to the first scanning line 3a1 from the scanning line driving circuits 102. Further, the data signal is simultaneously supplied to all of the data lines 6a from the data line driving circuit 101, and write-in to the plurality of first pixel electrodes 15a is performed simultaneously. Next, the first scanning lines 3a1 are closed as a result of the supply of the scanning signal to the first scanning lines 3a1 being ceased.

Next, the TFTs 30 are set to an ON state for a fixed period of time by supplying a second signal (a scanning signal), the phase of which is delayed by a predetermined amount with respect to the first signal, to the second scanning line 3a2 from the scanning line driving circuits 102. Further, the data signal is simultaneously supplied to all of the data lines 6a from the data line driving circuit 101, and write-in to the plurality of second pixel electrodes 15b is performed simultaneously.

Next, the TFTs 30 are set to an ON state for a fixed period of time by supplying a third signal (a scanning signal), the phase of which is delayed by a predetermined amount with respect to the second signal, to the third scanning line 3a3 from the scanning line driving circuits 102. Further, the data signal is simultaneously supplied to all of the data lines 6a from the data line driving circuit 101, and write-in to the plurality of third pixel electrodes 15c is performed simultaneously.

The first signal, the second signal and the third signal are, for example, the AC signals V1, V2 and V3 that are shown in FIG. 8. Additionally, in the same manner, the frequencies thereof are also 10 mHz to 50 mHz.

In this manner, since the AC signals V1, V2 and V3 are applied so that the phases of the second scanning lines 3a2 are delayed with respect to those of the first scanning lines 3a1, and the phases of the third scanning lines 3a3 are delayed with respect to those of the second scanning lines 3a2, the distribution of the electric field that is generated between each pixel electrode 15 migrates toward a direction of the third scanning lines 3a3 from the first scanning lines 3a1. As a result of this, it is possible to sweep up the ionic impurities 60 that are included inside the liquid crystal layer 50 in the direction of the third scanning lines 3a3 from the first scanning lines 3a1.

As described in detail above, according to the driving method of the liquid crystal device 400, and the liquid crystal device 400 of the third embodiment, it is possible to obtain the effect indicated below.

(7) According to the driving method of the liquid crystal device 400, and the liquid crystal device 400 of the third embodiment, since the AC signals V1, V2 and V3 are applied so that the phases of the second scanning lines 3a2 are delayed with respect to those of the first scanning lines 3a1, and the phases of the third scanning lines 3a3 are delayed with respect to those of the second scanning lines 3a2, the distribution of the electric field that is generated between each pixel electrode 15 migrates toward a direction of the third scanning lines 3a3 from the first scanning lines 3a1. As a result of this, it is possible to sweep up the ionic impurities 60 that are included inside the liquid crystal layer 50 in the direction of the third scanning lines 3a3 from the first scanning lines 3a1. In other words, since a specific scanning line 3a is simultaneously selected, and write-in is simultaneously performed in the order of the first pixel electrode regions 15a1, the second pixel electrode regions 15b2 and the third pixel electrode regions 15c3, it is possible to sweep the ionic impurities 60 that are included inside the liquid crystal layer 50 to the outer side of the display region E.

In addition to this, it is possible to sweep the ionic impurities 60 by causing the driving method to be different in a circuit configuration of a normal liquid crystal device 400.

Fourth Embodiment

Figure 14:
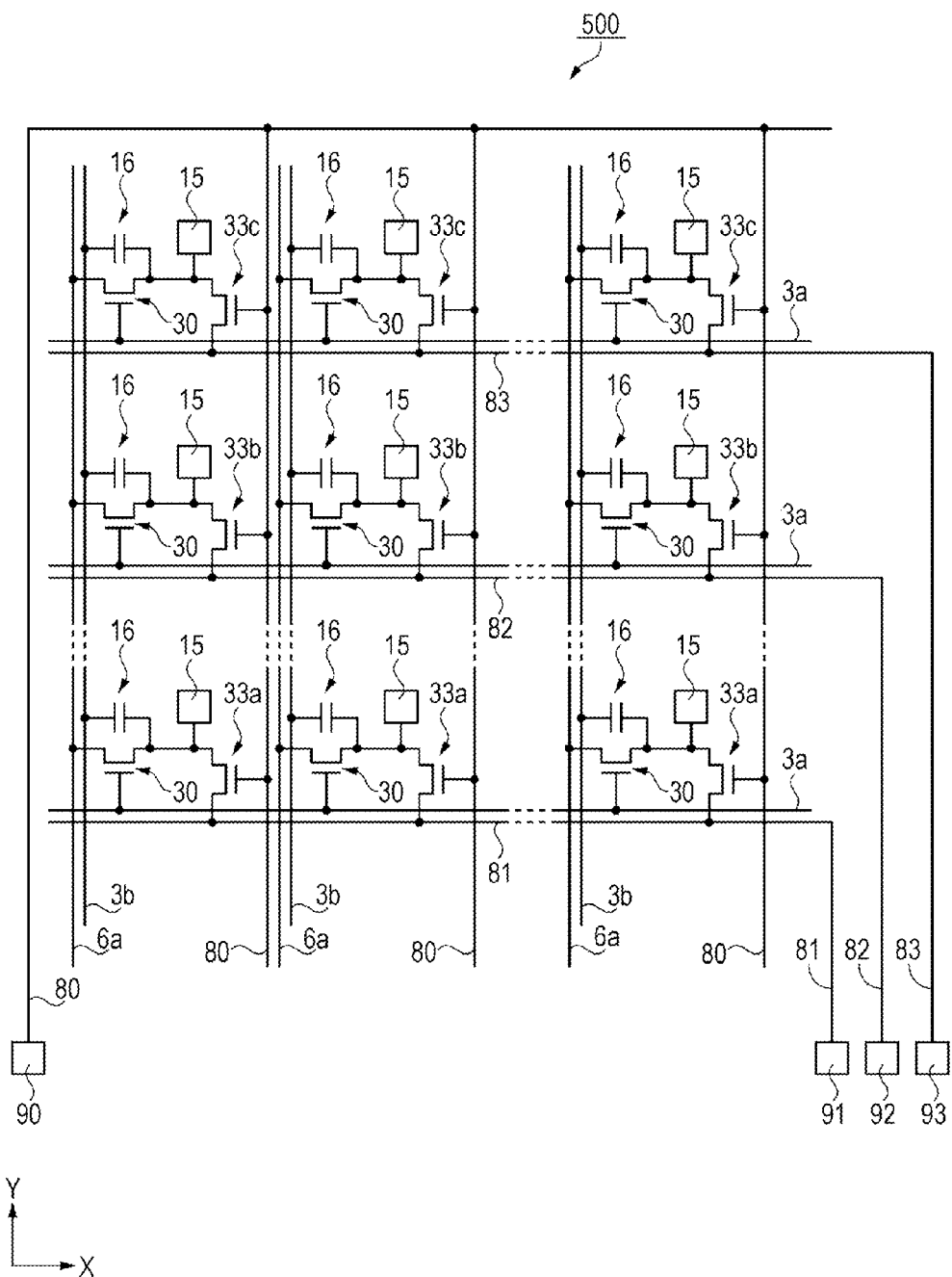
FIG. 14 is an equivalent circuit diagram that shows an electrical configuration of a liquid crystal device of a fourth embodiment.
Figure 15:
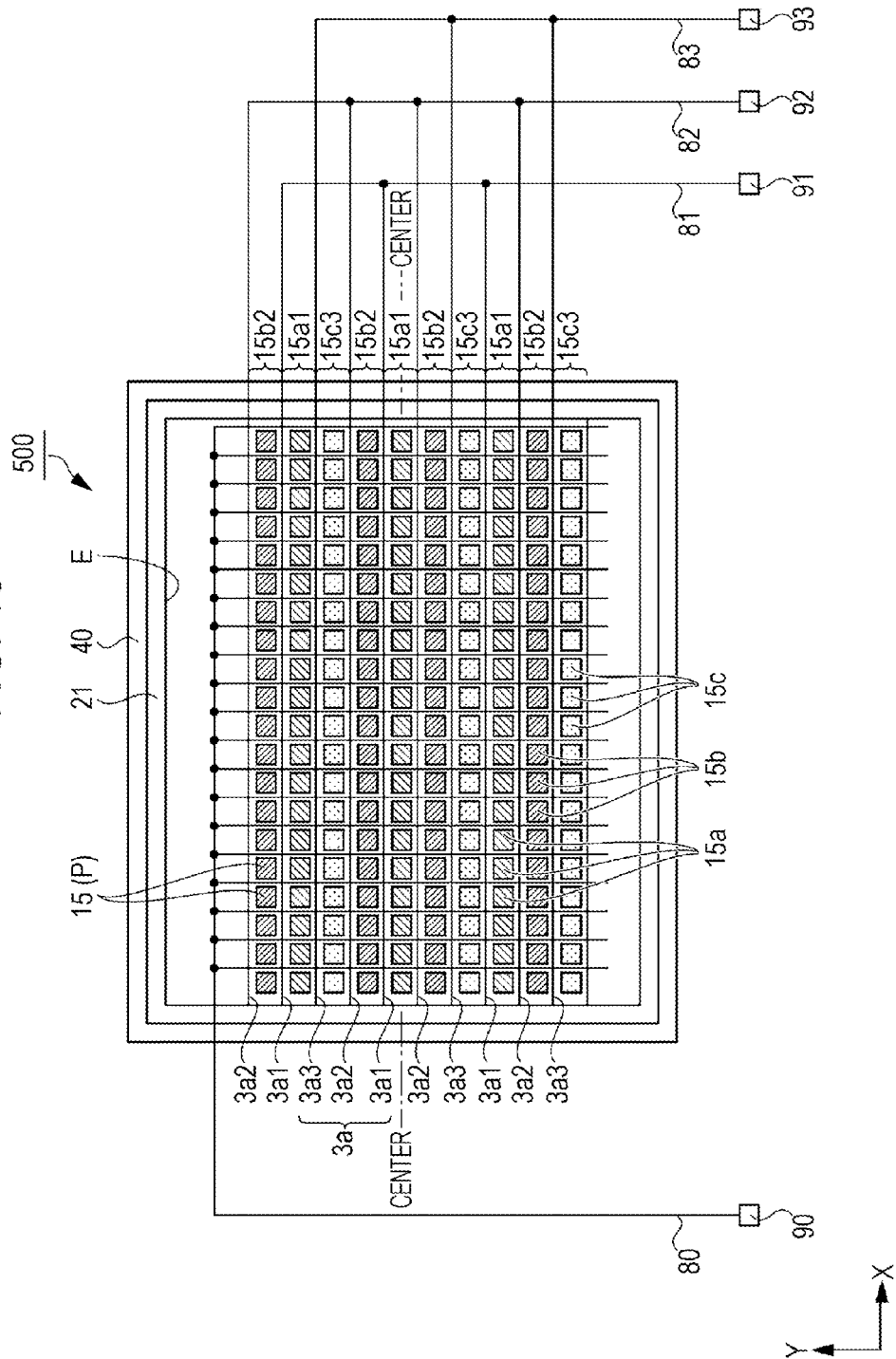
FIG. 15 is a schematic plan view for describing a method with which a voltage is applied to the liquid crystal device.

Configuration of Liquid Crystal Device and Driving Method of Liquid Crystal Device FIG. 14 is an equivalent circuit diagram that shows an electrical configuration of a liquid crystal device of a fourth embodiment. FIG. 15 is a schematic plan view for describing a method with which a voltage is applied to pixel electrodes of a liquid crystal device of a fourth embodiment. Hereinafter, a configuration of a liquid crystal device and a voltage application method will be described with reference to FIGS. 14 and 15.

A liquid crystal device 500 of the fourth embodiment differs from the above-mentioned liquid crystal device 400 of third embodiment in that a voltage is applied in the order of the first pixel electrodes 15a, the second pixel electrodes 15b and the third pixel electrodes 15c without using the data line driving circuit 101 and the scanning line driving circuits 102, and a portion that sweeps the ionic impurities 60 to the outer side different, and other portions are largely the same. Therefore, in the fourth embodiment, portions that differ from the third embodiment will be described in detail, and description of the other overlapping portions will be omitted as appropriate.

As shown in FIG. 14, in the display region E, the liquid crystal device 500 embodiment includes at least a plurality of scanning lines 3a and a plurality of data lines 6a that are mutually insulated from and are orthogonal to one another, and capacity lines 3b that are disposed in parallel along the data lines 6a.

Furthermore, the liquid crystal device 500 of the fourth embodiment includes at least a plurality of pieces of selection wiring 80 and a plurality of pieces of write-in wiring 81, 82 and 83 that are mutually insulated from and are orthogonal to one another, and TFTs 33.

The selection wiring 80 is electrically connected to the gates of transistors (the TFTs 33), which are switching elements. The selection wiring 80 is electrically connected to a selection terminal 90. By applying a voltage to the selection terminal 90, it is possible to select all of the TFTs 33 (33a, 33b and 33c) that are connected to a plurality of pieces of selection wiring 80.

First write-in wiring 81 is electrically connected to data line side source and drain region (one source and drain region) of TFTs 33a. The first pixel electrodes 15a are electrically connected to pixel electrode side source and drain regions (another source and drain region) of the TFTs 33. Additionally, the first write-in wiring 81 is electrically connected to a first write-in terminal 91.

In addition, second write-in wiring 82 is electrically connected to data line side source and drain region (one source and drain region) of TFTs 33b. The second pixel electrodes 15b are electrically connected to pixel electrode side source and drain regions (another source and drain region) of the TFTs 33. Additionally, the second write-in wiring 82 is electrically connected to a second write-in terminal 92.

In addition, third write-in wiring 83 is electrically connected to data line side source and drain region (one source and drain region) of TFTs 33c. The third pixel electrodes 15c are electrically connected to pixel electrode side source and drain regions (another source and drain region) of the TFTs 33. Additionally, the third write-in wiring 83 is electrically connected to a third write-in terminal 93.

Next, the driving method of the liquid crystal device 500 of the fourth embodiment will be described with reference to FIG. 15. A region of a plurality of first pixel electrodes 15a that are electrically connected to the first write-in wiring 81 via the TFTs 33a is referred to as a first pixel electrode region 15a1. A region of a plurality of second pixel electrodes 15b that are electrically connected to the second write-in wiring 82 via the TFTs 33b is referred to as a second pixel electrode region 15b2. A region of a plurality of third pixel electrodes 15c that are electrically connected to the third write-in wiring 83 via the TFTs 33c is referred to as a third pixel electrode region 15c3.

In the display region E, in the same manner as that of the third embodiment, pixel electrode regions are repeatedly arranged in the order of the second pixel electrode region 15b2 and the third pixel electrode region 15c3 toward a longitudinal direction of the sealing material 40 with the central first pixel electrode region 15a1 set as a center thereof.

Firstly, all of the TFTs 33 are set to an ON state by supplying a signal to all of the pieces of selection wiring 80 from the selection terminal 90. Further, a first signal is supplied to the first write-in wiring 81 from the first write-in terminal 91, and write-in to the plurality of first pixel electrodes 15a is performed simultaneously.

Next, a second signal, the phase of which is delayed by a predetermined amount with respect to the first signal, is supplied to the second write-in wiring 82 from the second write-in terminal 92, and write-in to the plurality of second pixel electrodes 15b is performed simultaneously.

Next, a third signal, the phase of which is delayed by a predetermined amount with respect to the second signal, is supplied to the third write-in wiring 83 from the third write-in terminal 93, and write-in to the plurality of third pixel electrodes 15c is performed simultaneously.

The first signal, the second signal and the third signal are, for example, the AC signals V1, V2 and V3 that are shown in FIG. 8. Additionally, in the same manner, the frequencies thereof are also 10 mHz to 50 mHz.

In this manner, since the AC signals V1, V2 and V3 are applied so that the phases of the second write-in wiring 82 are delayed with respect to those of the first write-in wiring 81, and the phases of the third write-in wiring 83 are delayed with respect to those of the second write-in wiring 82, the distribution of the electric field that is generated between each pixel electrode 15 migrates toward a direction of the third pixel electrode regions 15c3 from the first pixel electrode regions 15a1. As a result of this, it is possible to sweep up the ionic impurities 60 that are included inside the liquid crystal layer 50 in the direction of the third pixel electrode regions 15c3 from the first pixel electrode regions 15a1.

In addition, since dedicated wiring (80, 81, 82 and 83) for sweeping the ionic impurities 60 is provided, it is possible to perform driving without using an external power source during a few minutes of powering down of the abovementioned projection type display device 1000 or during a few minutes during operation thereof. More specifically, for example, it is possible to perform driving using a battery, which is inside the projection type display device 1000. In addition, since it is possible to perform driving with a battery, it is possible to perform driving for a long period of time without connecting to an AC power supply. In addition, it is possible to perform write-in of each signal without performing a scanning action.

As described in detail above, according to the driving method of the liquid crystal device 500, and the liquid crystal device 500 of the fourth embodiment, it is possible to obtain the effect indicated below.

(8) According to the driving method of the liquid crystal device 500, and the liquid crystal device 500 of the fourth embodiment, since the AC signals V1, V2 and V3 are applied so that the phases of the second write-in wiring 82 are delayed with respect to those of the first write-in wiring 81, and the phases of the third write-in wiring 83 are delayed with respect to those of the second write-in wiring 82, the distribution of the electric field that is generated between each pixel electrode 15 migrates toward a direction of the third pixel electrode regions 15c3 from the first pixel electrode regions 15a1. As a result of this, it is possible to sweep up the ionic impurities 60 that are included inside the liquid crystal layer 50 in the direction of the third pixel electrode regions 15c3 from the first pixel electrode regions 15a1. In addition, since dedicated wiring (80, 81, 82 and 83) for sweeping the ionic impurities 60 is provided, it is possible to perform driving without using an external power source during a few minutes of powering down of the abovementioned projection type display device 1000 or during a few minutes during operation thereof. More specifically, for example, it is possible to perform driving using a battery, which is inside the projection type display device 1000. In addition, since it is possible to perform driving with a battery, it is possible to perform driving for a long period of time without connecting to an AC power supply. In addition, it is possible to perform write-in of each signal without performing a scanning action.

Additionally, the aspects of the present invention are not limited to the abovementioned embodiments, and can be changed as appropriate within a range that does not depart from the scope or the idea of the invention that can be understood from the claims and the entirety of the specification, and such changes are also included in the technical range of the aspect of the present invention. In addition, the invention can be implemented in the following forms.

Modification Example 1

Figure 16:
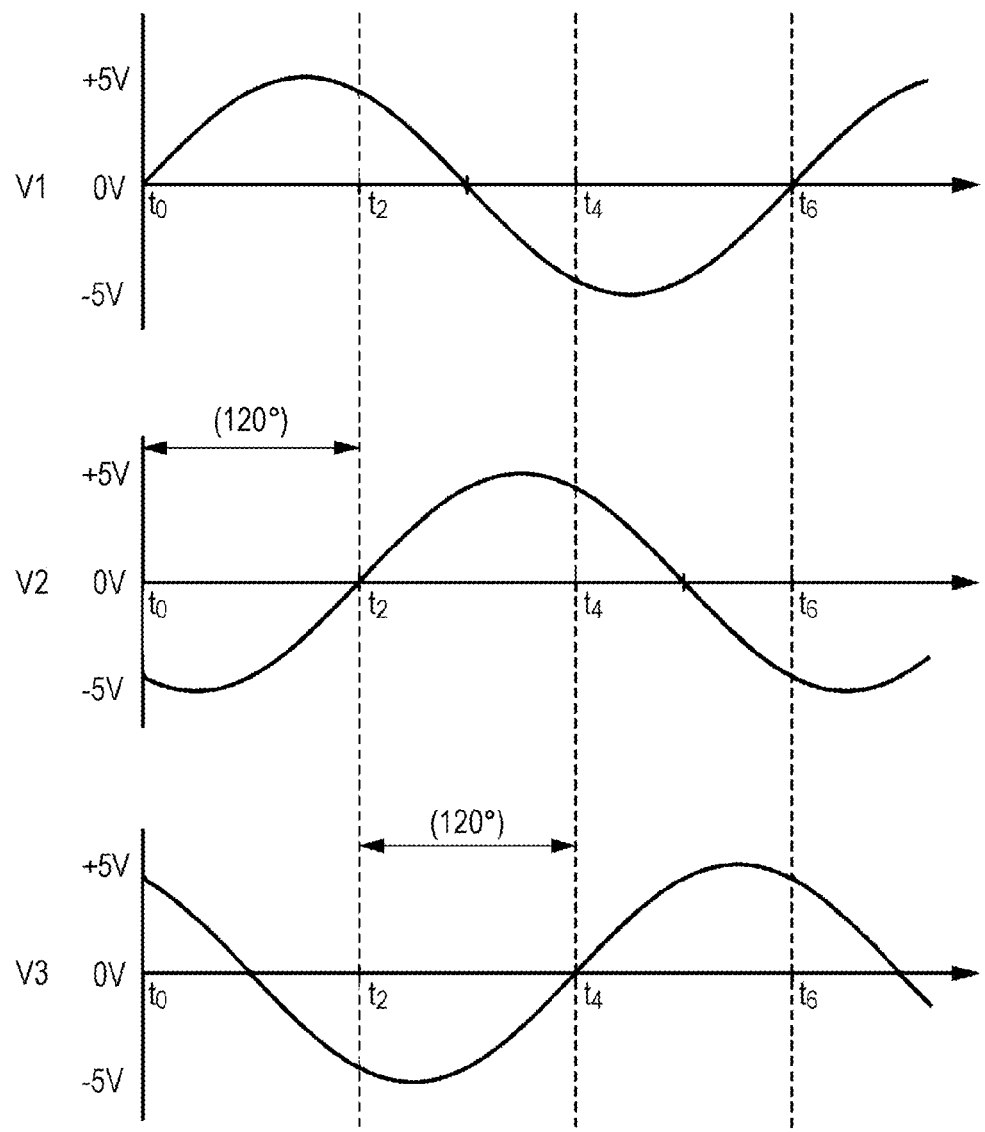
FIG. 16 is a schematic diagram that shows signal waveforms of AC signals of a modification example.

In the abovementioned manner, the AC signals V1, V2 and V3 are not limited to rectangular waves, and for example, a signal waveform such as that shown in FIG. 16 may be used. FIG. 16 is a case of a sine wave.

As shown in FIG. 16, in a case in which the AC signals V1, V2 and V3 are sine waves, in the same manner, the phase of the AC signal V2 is also delayed by 120° with respect to the AC signal V1. In addition, the phase of the AC signal V3 is delayed by 120° with respect to the AC signal V2. In addition, the AC signals V1, V2 and V3 are not limited to a rectangular wave and a sine wave and may be a triangular wave.

Additionally, in comparison with an analog circuit that creates an analog signal such as a sine wave, a digital circuit that creates a rectangular wave (and a triangular wave) can simplify the circuit configuration. In other words, judging from the difficulty of the waveform creation, a rectangular wave is easier to create than a sine wave. For example, a sequence according to which it is to create a signal waveform is the order of a rectangular wave, a triangular wave and a sine wave. Apart from for the difficulty of signal creation, a sine wave is an optimal signal waveform.

Modification Example 2

Figure 17:
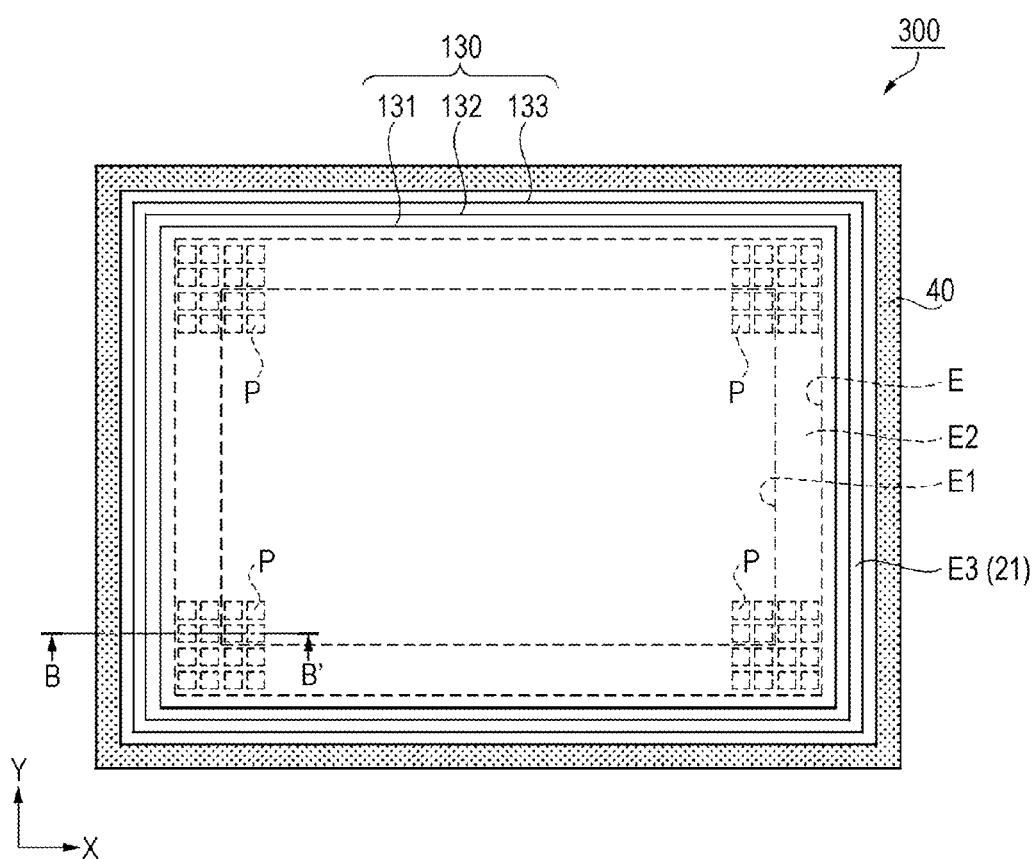
FIG. 17 is a schematic plan view that shows a configuration of a liquid crystal device of the modification example.
Figure 18:
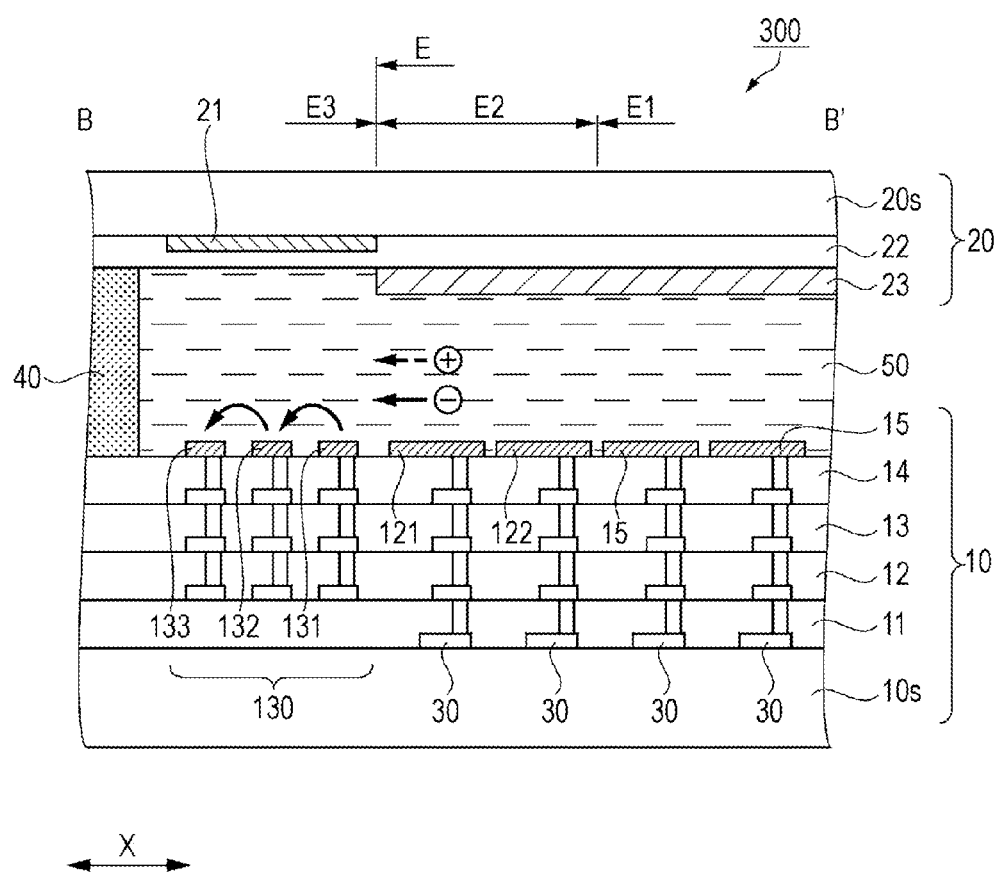
FIG. 18 is a schematic cross-sectional view along a line B-B' of the liquid crystal device of a modification example that is shown in FIG. 17.

In the abovementioned manner, in addition to sweeping the ionic impurities 60 to the outer side of the display region E using the pixel electrode 15, as shown in FIG. 17, sweeping out of the ionic impurities 60 may be performed out by providing a peripheral electrode 130 at the periphery of the display region E. FIG. 17 is a schematic plan view that shows a configuration of a liquid crystal device 300 of modification example 2. FIG. 18 is a schematic cross-sectional view along a line B-B' of the liquid crystal device 300 of modification example 2 that is shown in FIG. 17.

For example, an actual display region E1 that contributes to display, a dummy pixel region E2 that is disposed so as to surround the actual display region E1, and a frame-shaped sealing material 40 that surrounds the dummy pixel region E2 are provided in the liquid crystal device 300 that is shown in FIG. 17. In addition, a break line region E3 is provided between the sealing material 40 and the dummy pixel region E2.

The peripheral electrode 130 for sweeping the ionic impurities 60 out to the break line region E3, is provided on the third interlayer insulation film 14 in a region that overlaps with the break line region E3 in plan view. The peripheral electrode 130 includes a first electrode 131, a second electrode 132 and a third electrode 133, which each form a square frame shape in plan view.

An AC signal is applied to the first electrode 131, the second electrode 132 and the third electrode 133 so that a direction of an electric field (a line of electric force) that is generated between adjacent electrodes migrates to a direction of the third electrode 133 from the first electrode 131, which is close to the display region E.

In the facing substrate 20 of the present modification example, for example, the facing electrode 23 is provided overlapping with the actual display region E1 and the dummy pixel region E2 in plan view, and is not provided overlapping with the break line region E3 in plan view. More specifically, the facing electrode 23 is not provided in portions that face the respective first electrode 131, the second electrode 132 and the third electrode 133 through the liquid crystal layer 50.

Accordingly, it is difficult for an electric field to be generated between the respective first electrode 131, the second electrode 132 and the third electrode 133 and the facing electrode 23. In other words, the ionic impurities 60 are swept up to the break line region E3 efficiently without migration of the ionic impurities 60 being prevented as a result of an electric field that is generated between the respective first electrode 131, the second electrode 132 and the third electrode 133 and the facing electrode 23.

In addition, as shown in FIG. 18, sweeping of the ionic impurities 60 may be performed using dummy pixel electrodes 121 and 122 of the dummy pixel region E2.

More specifically, sweeping of the ionic impurities 60 may be performed by the pixel electrodes 15 of the display region E such as those of the first embodiment, and the dummy pixel electrodes 121 and 122 of the dummy pixel region E2 of the present modification example.

Dummy pixel electrodes 121 and 122 with configurations that are the same as those of the pixel electrodes 15 of actual display region E1 are provided in the dummy pixel region E2. By using the dummy pixel electrodes 121 and 122, it is possible to sweep (deliver) the ionic impurities 60 to a region that is distantly separated from the outer periphery of the actual display region E1 (to the peripheral electrode 130, for example). As a result of this, for example, it is possible to suppress a circumstance in which the ionic impurities 60 return to the actual display region E1 as a result of becoming scattered while the power supply of the projection type display device 1000 is turned off. As a result of this, it is possible to suppress a circumstance in which there is an effect on the display characteristics.

Additionally, more the dummy pixel electrodes 121 and 122 may be provided in order to sweep the ionic impurities 60 further. In addition, the peripheral electrode 130 is not limited to the three electrodes of the first electrode 131 to the third electrode 133, and the number of electrodes may be increased depending on the width of a region.

In addition, although the sweeping efficiency is reduced slightly, the facing electrode 23 may be provided across the entirety of the facing substrate 20. As a result of this, since the facing electrode 23 is not patterned, it is possible to suppress an increase in a number of processes.

Modification Example 3

In place of applying the AC signal to each pixel electrode 15 using the scanning lines 3a in the abovementioned manner, the AC signal may be applied to each pixel electrode 15 using the data lines 6a. In addition, the invention is not limited to a line inversion driving technique, and may use a dot inversion driving method.

Modification Example 4

The invention is not limited to each write-in wiring 81, 82 and 83 being disposed extending in the X direction in the manner of the fourth embodiment, and each write-in wiring 81, 82 and 83 may be disposed extending in the Y direction. In addition, the invention is not limited to the selection wiring 80 being disposed extending in the Y direction, and may be disposed extending in the X direction. In addition, the selection wiring 80 may be disposed depending on the vertical and horizontal lengths of the display region E of the liquid crystal device.

Modification Example 5

In the abovementioned manner, the invention is not limited to being adopted in the liquid crystal device 100 as an electro-optical device, and for example, may be adopted in an organic EL device, plasma display, electronic paper (EPD), or the like. For example, in a case of a liquid crystal device, the electro-optical material is liquid crystal. In a case of electronic paper, the electro-optical material is an electrophoretic material.

REFERENCE SIGNS LIST

3a Scanning line
3a1 first scanning line as first wiring
3a2 second scanning line as second wiring
3a3 third scanning line as third wiring
3b capacity line
CNT1 to CNT5 contact holes
6a data line (fourth wiring and fifth wiring)
6b first relay electrode
7a wiring
7b second relay electrode
10 element substrate as a first substrate
10s base material
11a first insulation film
11b second insulation film
11c third insulation film
12 wiring layer
13a second interlayer insulation film
13b insulation film
14 third interlayer insulation film
15 pixel electrode
15a first pixel electrode
15b second pixel electrode
15c third pixel electrode
16 capacity element
16a first capacity electrode
16b dielectric layer
16c second capacity electrode
16d third relay electrode
18 and 24 alignment films
18a columns
20 facing substrate as second substrate
20s base material
21 break line section
22 insulation layer
23 facing electrode
30 TFT
30a semiconductor layer
30g gate electrode
31 source electrode
32 drain electrode
33, 33a, 33b, 33c TFT
40 sealing material
50 liquid crystal layer as electro-optical layer
60 ionic impurities
71 temperature sensor
80 selection wiring
81 first write-in wiring
82 second write-in wiring
83 third write-in wiring 90 selection terminal
91 first write-in terminal
92 second write-in terminal
93 third write-in terminal
100, 200, 300, 400, 500 liquid crystal device
101 data line driving circuit
102 scanning line driving circuit
103 detection circuit
104 external connection terminal
105 wiring
106 upper and lower conduction section
110 liquid crystal panel
121 and 122 dummy pixel electrodes
130 peripheral electrode
131 first electrode
132 second electrode
133 third electrode
1000 projection type display device
1100 polarized light illumination device
1101 lamp unit
1102 integrator lens
1103 polarized light conversion element
1104 and 1105 dichromatic mirrors
1106, 1107 and 1108 reflective mirrors
1201, 1202, 1203, 1204 and 1205 relay lenses
1206 cross dichroic prism
1207 projection lens
1210, 1220 and 1230 liquid crystal light bulbs
1300 screen

The invention claimed is:

1. A driving method of an electro-optical device that is provided with
a first substrate,
a second substrate that is disposed facing the first substrate, and
an electro-optical layer that is disposed between the first substrate and the second substrate,
the method comprising:
applying a first AC signal to a first pixel electrode that is provided corresponding to a first wiring;
applying a second AC signal to a second pixel electrode that is provided corresponding to a second wiring, which is disposed adjacent to the first wiring; and
applying the second AC signal to a third pixel electrode that is provided corresponding to a third wiring, which is disposed adjacent to the first wiring on a side of the first wiring that is opposite to the second wiring,
wherein
a phase of the second AC signal is delayed by a predetermined amount with respect to that of the first AC signal,
the first wiring is disposed along and is directly adjacent to a center line that bisects an effective pixel region, and
the second wiring and the third wiring are disposed adjacent to and parallel to the first wiring towards respective outer sides of the effective pixel region.

2. The driving method of an electro-optical device according to claim 1, further comprising
applying an additional AC signal to an additional pixel electrode that is provided corresponding to an additional wiring, which is disposed facing the first wiring so as to interpose the second wiring therebetween,
wherein a phase of the additional AC signal is delayed by a predetermined amount with respect to that of the second AC signal.

3. The driving method of an electro-optical device according to claim 1, wherein a frequency of the first AC signal is 10 mHz to 50 mHz.

4. The driving method of an electro-optical device according to claim 1, wherein a difference between a temporal average and a reference potential of a voltage of the first AC signal is substantially 0 V.

5. The driving method of an electro-optical device according to claim 1, wherein a frequency of the first AC signal is changed depending on a temperature of the electro-optical layer.

6. The driving method of an electro-optical device according to claim 1, wherein the first wiring and the second wiring are scanning lines.

7. The driving method of an electro-optical device according to claim 6, wherein the scanning lines are disposed along a long edge of the effective pixel region.

8. The driving method of an electro-optical device according to claim 1, wherein a waveform of the first AC signal is any one of a rectangular wave, a sine wave, and a triangular wave.

9. A driving method of an electro-optical device that is provided with
a first substrate,
a second substrate that is disposed facing the first substrate,
an electro-optical layer that is disposed between the first substrate and the second substrate,
a first wiring,
a second wiring that is disposed adjacent to the first wiring,
a first pixel electrode that is provided corresponding to the first wiring via a first switching element,
a second pixel electrode that is provided corresponding to the second wiring via a second switching element,
a third pixel electrode that is provided corresponding to a third wiring via a third switching element, the third wiring being disposed adjacent to the first wiring on a side of the first wiring that is opposite to the second wiring, and
a selection wiring that is electrically connected to the first switching element, the second switching element, and the third switching element,
wherein
when the first switching element, the second switching element, and the third switching element are selected by applying a voltage to the selection wiring, a first AC signal is applied to the first pixel electrode by way of the first wiring and a second AC signal, with a phase that differs from that of the first AC signal, is applied to the second pixel electrode by way of the second wiring and to the third pixel electrode by way of the third wiring,
the first wiring is disposed along and is directly adjacent to a center line that bisects an effective pixel region, and
the second wiring and the third wiring are disposed adjacent to and parallel to the first wiring towards respective outer sides of the effective pixel region.

10. The driving method of an electro-optical device according to claim 9,
wherein the electro-optical device is provided with
an additional wiring that is disposed facing the first wiring so as to interpose the second wiring, and
an additional pixel electrode that is provided corresponding to the additional wiring via an additional switching element, and wherein when the first switching element, the second switching element, the third switching element, and the additional switching element are selected by applying a voltage to the selection wiring, an additional AC signal, with a phase that differs from those of the first AC signal and the second AC signal, is applied to the additional wiring.

11. An electro-optical device comprising:
a first substrate;
a second substrate that is disposed facing the first substrate;
an electro-optical layer that is disposed between the first substrate and the second substrate;
a first pixel electrode that is disposed so as to cover the first substrate;
a first wiring, which is provided corresponding to the first pixel electrode and through which a first AC signal is applied to the first pixel electrode;
a second pixel electrode;
a second wiring, which is disposed adjacent to the first wiring and is provided corresponding to the second pixel electrode and through which a second AC signal is applied to the second pixel electrode;
a third pixel electrode; and
a third wiring, which is provided corresponding to the third pixel electrode and through which the second AC signal is applied to the third pixel electrode, the third wiring being disposed adjacent to the first wiring on a side of the first wiring that is opposite to the second wiring,
wherein
  a phase of the second AC signal is delayed by a predetermined amount with respect to that of the first AC signal,
  the first wiring is disposed along and is directly adjacent to a center line that bisects an effective pixel region, and
  the second wiring and the third wiring are disposed adjacent to and parallel to the first wiring towards respective outer sides of the effective pixel region.

12. The electro-optical device according to claim 11, further comprising:
an additional pixel electrode; and
an additional wiring that is disposed facing the first wiring so as to interpose the second wiring, and is provided corresponding to an additional pixel electrode, and to which an additional AC signal is applied,
wherein a phase of the additional AC signal is delayed by a predetermined amount with respect to that of the second AC signal.

13. The electro-optical device according to claim 11, wherein a frequency of the first AC signal is 10 mHz to 50 mHz.

14. The electro-optical device according to claim 11, wherein a difference in potential between a temporal average and a reference potential of a voltage of the first AC signal is substantially 0 V.

15. The electro-optical device according to claim 11, wherein the first wiring and the second wiring are scanning lines.

16. The electro-optical device according to claim 11 wherein the electro-optical layer is a liquid crystal layer, and
wherein an inorganic orientation film is disposed on a liquid crystal layer side of the first substrate and the second substrate.

17. An electro-optical device comprising:
a first substrate;
a second substrate that is disposed facing the first substrate;
an electro-optical layer that is disposed between the first substrate and the second substrate;
a first wiring;
a second wiring that is disposed adjacent to the first wiring;
a third wiring that is disposed adjacent to the first wiring on a side of the first wiring that is opposite to the second wiring;
a first pixel electrode that is provided corresponding to the first wiring via a first switching element;
a second pixel electrode that is provided corresponding to the second wiring via a second switching element;
a third pixel electrode that is provided corresponding to the third wiring via a third switching element; and
a selection wiring that is electrically connected to the first switching element, the second switching element, and the third switching element,
wherein
  when the first switching element, the second switching element, and the third switching element are selected by applying a voltage to the selection wiring, a first AC signal is applied to the first pixel electrode by way of the first wiring and a second AC signal, with a phase that differs from that of the first AC signal, is applied to the second pixel electrode by way of the second wiring and to the third pixel electrode by way of the third wiring,
  wherein the first wiring is disposed along and is directly adjacent to a center line that bisects an effective pixel region, and
  the second wiring and the third wiring are disposed adjacent to and parallel to the first wiring towards respective outer sides of the effective pixel region.

18. The electro-optical device according to claim 17, further comprising:
an additional wiring that is disposed facing the first wiring so as to interpose the second wiring; and
an additional pixel electrode that is provided corresponding to to the additional wiring via an additional switching element,
wherein when the first switching element, the second switching element, the third switching element, and the additional switching element are selected by applying a voltage to the selection wiring, an additional AC signal with a phase that differs from those of the first AC signal and the second AC signal is applied to the additional wiring.

19. An electronic apparatus comprising:
the electro-optical device according to claim 11.

20. The driving method of an electro-optical device according to claim 9, wherein the electro-optical device is further provided with
a first scan line that is provided corresponding to the first pixel electrode,
a second scan line that is provided corresponding to the second pixel electrode, and
a data line that is orthogonal to the first scan line and the second scan line and that is provided corresponding to the first pixel electrode and to the second pixel electrode.

21. The driving method of an electro-optical device according to claim 20, wherein:

the first scan line and the data line are provided corresponding to the first pixel electrode by way of a third switching element; and the second scan line and the data line are provided corresponding to the second pixel electrode by way of a fourth switching element.

\* \* \* \* \*